(12) United States Patent
Einhaus et al.

(10) Patent No.: US 9,496,940 B2
(45) Date of Patent: Nov. 15, 2016

(54) PRECODING MATRIX SET QUALITY MEASUREMENT AND REPORTING

(75) Inventors: Michael Einhaus, Langen (DE); Christian Wengerter, Langen (DE); Alexander Golitschek Edler von Elbwart, Langen (DE); Masayuki Hoshino, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 7 days.

(21) Appl. No.: 14/356,344

(22) PCT Filed: Sep. 13, 2012

(86) PCT No.: PCT/EP2012/067938
§ 371 (c)(1),
(2), (4) Date: May 5, 2014

(87) PCT Pub. No.: WO2013/068155
PCT Pub. Date: May 16, 2013

(65) Prior Publication Data
US 2014/0286291 A1    Sep. 25, 2014

(30) Foreign Application Priority Data

Nov. 7, 2011  (EP) ..................................... 11008827

(51) Int. Cl.
*H04B 7/06* (2006.01)
*H04B 7/02* (2006.01)
*H04B 7/04* (2006.01)

(52) U.S. Cl.
CPC ............ *H04B 7/0639* (2013.01); *H04B 7/024* (2013.01); *H04B 7/0417* (2013.01); *H04B 7/0632* (2013.01); *H04B 7/0634* (2013.01); *H04B 7/0654* (2013.01); *H04B 7/0665* (2013.01)

(58) Field of Classification Search
CPC  H04B 7/0639; H04B 7/0634; H04B 7/0632; H04B 7/0665; H04B 7/0417; H04B 7/024; H04B 7/0654
See application file for complete search history.

(56) References Cited

U.S. PATENT DOCUMENTS 8,243,835 B2    8/2012 Sun et al.
2008/0293371 A1* 11/2008 Kishigami ........... H04B 7/0452
                                                        455/278.1

(Continued)

FOREIGN PATENT DOCUMENTS

| JP | 2009-521890 A | 6/2009 |
| JP | 2012-520602 A | 9/2012 |
| WO | 2010/104343 A2 | 9/2010 |

OTHER PUBLICATIONS

LG Electronics, "Extending Rel-8/9 ICIC for heterogeneous network", 3GPP TSG RAN WG1 Meeting #60bis, R1-102430, Apr. 12-16, 2010, Beijing, China.
Notice of Reasons for Rejection for Application No. JP 2014-539265 dated Apr. 12, 2016.

*Primary Examiner* — Mohammad Anwar
(74) *Attorney, Agent, or Firm* — Pearne & Gordon LLP

(57) ABSTRACT

The invention relates to methods for determining the interference variability of a precoding matrix set, and the use of same for purposes of scheduling and precoding matrix set selection. The precoding matrix set used by an interferer base station is evaluated by the mobile terminal which experiences the intercell interference from the interferer base station. The mobile terminal is informed about the precoding matrices of the precoding matrix set used by the base station. The mobile terminal measures the radio channel to the interferer cell, and then estimates based on the measured radio channel and with the knowledge on the particular precoding matrices of the precoding matrix set, the interference variability of the precoding matrix set. The interference variability may be reported to the serving base station of the mobile terminal, and thus considered for scheduling decisions by the serving base station referring the mobile terminal.

14 Claims, 11 Drawing Sheets

(56) References Cited

U.S. PATENT DOCUMENTS

| | | | |
|---|---|---|---|
| 2009/0215480 A1* | 8/2009 | Kim | H04B 7/024 455/501 |
| 2011/0105164 A1* | 5/2011 | Lim | H04B 7/0417 455/501 |
| 2013/0176887 A1* | 7/2013 | Seo | H04B 7/024 370/252 |

* cited by examiner

|  | UE1 | UE2 |
|---|---|---|
| SINR | 8dB | 10dB |
| Reported CQI | 9 | 10 |
| BLER | 5% | 37% |
| throughput [bits/symbol] | 1.82 | 1.72 |
| nominal bit rate (without BLER) [bits/symbol] | 1.92 | 2.73 |

|  | UE1 | UE2 |
|---|---|---|
| SINR | 10dB | 10dB |
| Reported CQI | 10 | 10 |
| BLER | 5% | 37% |
| throughput [bits/symbol] | 2.59 | 1.72 |
| nominal bit rate (without BLER) | 2.73 | 2.73 |

| | IPMI set A | IPMI set B |
|---|---|---|
| SINR | 8dB | 10dB |
| IPMI std | 1dB | 5dB |
| Effective quality | 7dB | 5dB |
| Reported CQI | 9 | 10 |
| BLER | 5% | 37% |
| nominal bit rate (without BLER) [bits/symbol] | 1.92 | 2.73 |
| throughput [bits/symbol] | 1.82 | 1.72 |

| | IPMI set A | IPMI set B |
|---|---|---|
| SINR | 10dB | 10dB |
| IPMI std | 1dB | 5dB |
| Effective quality | 9dB | 5dB |
| Reported CQI | 10 | 10 |
| BLER | 5% | 37% |
| nominal bit rate (without BLER) | 2.73 | 2.73 |
| throughput [bits/symbol] | 2.59 | 1.72 |

PRECODING MATRIX SET QUALITY MEASUREMENT AND REPORTING

FIELD OF THE INVENTION

The invention relates to methods for determining a quality measure of a precoding matrix set used by an interferer base station. The invention is also providing the mobile terminal and the base station apparatus for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers (component carriers) are aggregated in order to support wider transmission bandwidths up to 100 MHz. Several cells in the LTE system are aggregated into one wider channel in the LTE-Advanced system which is wide enough for 100 MHz even though these cells in LTE are in different frequency bands.

All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible. Existing mechanism (e.g. barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Channel Quality Reporting

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. A channel resource may be defined as a "resource block" as exemplary illustrated in FIG. 4 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, subframe, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

Assuming that the smallest assignable resource unit is a resource block, in the ideal case channel quality information for each and all resource blocks and each and all users should be always available. However, due to constrained capacity of the feedback channel this is most likely not feasible or even impossible. Therefore, reduction or compression techniques are required so as to reduce the channel quality feedback signalling overhead, e.g. by transmitting channel quality information only for a subset of resource blocks for a given user.

In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality). When activating a downlink component carrier, it's important that the eNodeB acquires quickly CSI information for the newly activated component carrier(s) in order to being able to select an appropriate MCS for efficient downlink scheduling. Without CSI information the eNodeB doesn't have knowledge about the user equipment's downlink channel state and would most likely select a too aggressive or too conservative MCS for downlink data transmission, both of which would in turn lead to resource utilization inefficiency due to required retransmissions or unexploited channel capacity.

Channel State Information Feedback Elements

Commonly, mobile communication systems define special control signalling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification PMI: Precoding Matrix Indicator RI: Rank Indicator The MCSI suggests a modulation and coding scheme that should be used for transmission, while the PMI points to a pre-coding matrix/vector that is to be employed for spatial multiplexing and multi-antenna transmission (MIMO) using a transmission matrix rank that is given by the RI. Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4, 3GPP TS 36.212, "Evolved Universal Terrestrial Radio Access (E-UTRA); Multiplexing and channel coding", version 10.0.0, particularly sections 5.2.2, 5.2.4, 5.3.3, 3GPP TS 36.213, "Evolved Universal Terrestrial Radio Access (E-UTRA); Physical layer procedures", version 10.0.1, particularly sections 7.1.7, and 7.2.

In 3GPP LTE, not all of the above identified three channel quality elements are reported at any time. The elements being actually reported depend mainly on the configured reporting mode. It should be noted that 3GPP LTE also supports the transmission of two codewords (i.e. two codewords of user data (transport blocks) may be multiplexed to and transmitted in a single subframe), so that feedback may be given either for one or two codewords. Some details are provided in the next sections and in Table 1 below for an exemplary scenario using a 20 MHz system bandwidth. It should be noted that this information is based on 3GPP TS 36.213, section 7.2.1 mentioned above.

Heterogeneous Networks

In the coming years, operators will begin deploying a new network architecture termed Heterogeneous Networks (HetNet). A typical HetNet deployment as currently discussed within 3GPP consists of macro and pico cells. Pico cells are formed by low power eNBs that may be advantageously placed at traffic hotspots in order to offload traffic from macro cells. Macro and pico eNBs implement the scheduling independently from each other. The mix of high power macro cells and low power pico cells can provide additional capacity and improved coverage.

Pico Cells can be further provided with cell rage expansion (CRE) as a means to increase the throughput performance in such deployments. A UE connects to a macro eNB only if the received power is at least G dB larger than the received power from the strongest pico eNB, where G is the semi-statically configured CRE bias. Typical values are expected to range from 0 to 20 dB.

FIG. 5 illustrates such a HetNet scenario where various pico cells are provided in the area of one macro cell. The pico cells are depicted with two edges where one edge refers to the pico cell edge without CRE and the other to the pico cells with CRE. Various UEs are shown located in the various cells.

However, the additional capacity provided by the smaller cells may be lost due to signal interference experienced by the UEs in the pico cells. The macro eNB is the single dominant interferer for pico UEs, i.e. for UEs being connected to the pico eNB. This is especially true for pico UEs at the cell edge when using CRE.

Furthermore, the interference problem is aggravated when multiple antenna transmissions are used, as will be explained in the following.

Multiple Antenna System

Multiple Input Multiple Output (MIMO) systems form an essential part of LTE in order to achieve the ambitious requirements for throughput and spectral efficiency. Multiple-input and multiple-output is the use of multiple antennas at both the transmitter and receiver to improve communication performance. It is one of several forms of smart antenna technology. Note that the terms input and output refer to the radio channel carrying the signal, not to the devices having antennas.

From a high-level perspective, MIMO can be sub-divided into three main categories, beamforming, spatial multiplexing and diversity coding.

MIMO transmissions are in general based on precoding which can be seen as multi-stream beamforming, in the narrowest definition. In more general terms, it is considered to be all spatial processing that occurs at the transmitter. Beamforming takes advantage of interference to change the directionality of the transmitted signal. When transmitting, a beamformer controls the phase and relative amplitude of the signal at each transmitter, in order to create a pattern of constructive and destructive interference in the wavefront.

In single-layer beamforming, the same signal is emitted from each of the transmit antennas with appropriate phase (and sometimes gain) weighting such that the signal power is maximized at the receiver input. The benefits of beamforming are to increase the received signal power level, by making signals emitted from different antennas add up constructively, and to reduce the multipath fading effect; this effect is known as beamforming gain. In the absence of scattering, beamforming results in a well defined directional pattern, but in typical cellular deployments conventional beams are not a good analogy. When there are multiple receivers (mobile terminals) in the system, superposition of multiple transmit beams can be performed if the receives have sufficient spatial separation. Precoding for beamforming requires knowledge of channel state information (CSI) at the transmitter in order to provide optimum adaptation to the channel. Note that single-layer beamforming does in general not require multiple receive antennas on the mobile terminal side.

Spatial multiplexing requires multiple transmit and receive antennas. In spatial multiplexing, a high rate signal is split into multiple lower rate streams and each stream is transmitted on a spatial layer which is mapped onto the set of transmit antennas in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers (mobile terminals), known as multi-user MIMO. By scheduling receivers with different spatial signatures, good separability can be assured.

When there is no channel knowledge at the transmitter, diversity coding techniques can be used. In diversity methods, a single data stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge on the transmitter side, there is no beamforming gain from diversity coding.

Spatial multiplexing can also be combined with beamforming if the channel is known at the transmitter or combined with diversity coding if increased decoding reliability is required.

Precoding

In case of downlink MIMO, each base station (eNB) perform precoding on the transmit antennas to adapt the data transmission towards the mobile stations to the current radio channel conditions. In case of a radio channel without any reflections this would correspond to steering the transmission beam into the direction of the receiving mobile terminal. This is achieved by multiplying the signal vector with a precoding matrix W before transmission. With codebook based closed-loop MIMO the mobile terminal estimates the radio channel and selects the optimum precoding matrix W that is selected from a predefined codebook which is known at base station and mobile terminal side. The optimum precoding matrix is the one which offers maximum capacity. The precoding matrices are identified by Precoding Matrix Indicator (PMI) values corresponding to codebook indices according to the corresponding Tables in Chapter 6.3.4.2.3 "Codebook for precoding" of 3GPP document TS 36.211 v10.0.0. As apparent from the above-mentioned tables, the PMI may be 2 or 3 bits long depending on the antenna ports used for transmission and the associated rank indicator (RI).

This feedback is provided to the base station. Depending on the available bandwidth, this information is made available per resource block or group of resource blocks, since the optimum precoding matrix may vary between resource blocks. The network may configure a subset of the codebook that the mobile terminal is able to select from.

The scheduler in the base station selects the precoding matrix thus mainly based on the radio channel characteristics between the base station and the mobile station. Without taking into account which precoding matrices are used in the neighbouring cells, the power radiation patterns (beams) formed by the different cells may collide with each other, resulting in substantial intercell-interference for the cell-edge users. PMI coordination will be explained below.

Intercell Interference and Coordination

Cell-edge users usually have relatively low received signal strength and suffer from strong intercell interference. Boosting the transmission power may increase the received signal strength, but will also create a stronger intercell interference to other cell's cell-edge users and hence reduces their throughput. It is thus important to provide intercell and intracell interference mitigation.

In multi-antenna transmissions with precoding on the interferer side, mobile terminals in the interfered cell may be strongly affected by the use of different precoding matrices in the interfering base station.

The basic interference impact factors are:

Very high average interference level

Very high SINR (CQI) estimation uncertainty due to strong interference flashlight effect The Interference Flashlight Effect refers to the effect that each precoding matrix that is used by the interfering base station (described by an Interferer Precoding Matrix Indicator—IPMI) yields a different interference power level on the interference victim mobile terminal side. Since the interferer uses different IPMIs at different times (depending on the multiuser scheduling), the interference victim mobile terminal experiences strong interference fluctuations depending on the IPMIs used by the interference source (interferer base station). These fluctuations are known as the flashlight effect and can result in severe uncertainty concerning the interference level estimation on the victim emobile terminal side.

In order to improve the throughput performance of cell-edge mobile terminals, the interference impact has to be reduced on the resource on which these mobile terminals are scheduled for downlink transmission. The objective of Inter-Cell Interference Coordination (ICIC) is to maximize the multi-cell throughput subject to power constraints, inter-cell signaling limitations, fairness objectives and minimum bit rate requirements.

One solution for interference mitigation is to use subframe patterns with different interference statistics. The concept of creating different interference patterns (e.g. different average interference power levels) of different subframe sets is supported by restricted interference measurements on configured subframe sets as specified in 3GPP RAN1:

Reporting processes for different subframe sets (e.g. Almost Blank Subframe (ABS), non-ABS)

Reports are based on average estimated interference level for a reference resource The channel quality is reported to the serving base station (eNB) in form of CQI (Channel Quality Indicator) reports which correspond to a quantization of the expected SINR level on the receiver side. However, CQI reports for different subframe sets provide no information about expected variability of the interference power level (i.e. flashlight effect); only the average interference power level is taken into account.

Importantly, a strong variability of the interference power level (i.e. flashlight effect) can significantly increase the Block Error Rate (BLER) on the receiver side which results in reduced spectral efficiency.

The Best Companion concept is known to mitigate interference, introducing additional codebook-based channel state information in addition to best weight indices (i.e. PMI) that are exchanged between sites. In particular, the mobile terminals (UEs) measure the channel and report the best beam index (rank1 PMI) for their serving base station, i.e. the codebook index of the own transmit weight which maximises the SINR at the receiver output (depending on receiver algorithm supported by mobile terminal), taking into account noise and inter-cell interference. The mobile terminals report so-called best-companion indexes (BCI) for the serving base station, i.e. the codebook index of a potential co-scheduled interferer which maximises the SINR at the receiver output, e.g. a linear MMSE receive matrix which is calculated based on PMI and candidate BCI. The mobile terminals report the CQI for the case that the BCIs are not used. For the case that the best BCIs are used a delta-CQI is reported. In order to minimize intra-cell interference, based on this additional information, for dual stream MU-MIMO, the base station now can pair two mobile terminals n, m, where the PMI of m is the BCI of n, and vice versa. As a result, spectral efficiency will be increased.

Another approach to reduce inter-cell interference is the restriction of precoding matrices in the interfering eNBs. PMI coordination (restriction or recommendation) has been adopted to mitigate inter-cell interference from adjacent cells especially for codebook based closed-loop MIMO systems. Multi-cell coordination of beamforming requires channel knowledge at the transmitter, including the knowledge of interfering neighbour cells (base stations). The interfering base station restricts the precoding based on feedback reports from the interference victim mobile terminal (UEs).

The Worst Companion Index (WCI) is known from the prior art where its feedback efficiently provides information using precoding codebook indices. The UEs measure the channels from a set of dominant interfering cells (base stations), and report the cell and the worst-companion (i.e. strongest interference precoder) PMIs (WCI) for the set of interfering cells. One WCI is thus the tuple of a cell identifier and a precoding matrix indicator (Interferer PMI). Additionally, it may provide the classical channel quality indicator connected to the serving link of the interference victim mobile terminal as well as a delta-CQI, which indicates the estimated gain in case the reported WCI is not used by the interfering neighbour cell (e.g. reflecting the difference in mean signal-to-interference-and-noise ratio, SINR, with and without the WCI). In order to minimize inter-cell interference based on this additional information, beam coordination can now occur. Exemplary, for WCI-reporting a centralized scheduler over low latency backhaul can now schedule users (mobile terminals) of different cells such that on a given time-frequency resource, no interference from reported WCIs will occur, thus reducing the overall interference of the system. As a result, especially cell-edge user throughput will be increased and also spectral efficiency of the system.

At the interferer base station the precoding matrix usage is restricted based on the Worst Companion Index report from the interference victim mobile terminals. An interference victim mobile terminal informs the network about the "worst" PMIs used by the interferer base station causing the highest expected interference at the UE. Of course, different mobile terminals may report different WCI depending on their location. In said case, a restriction applied at the interferer base station is based on a union of the reported WCIs of all involved mobile terminals.

The PMI (IPMI) restrictions based on the WCI reports from the interference victim mobile terminals (UEs) prevent the interferer base station (eNB) from using those IPMIs yielding the maximum inteference at the victim mobile terminal. However, WCI reporting does not necessarily result in IPMI restriction with minimum flashlight effect since the focus of this concept is on minimizing the average interference power level and not flashlight reduction. In particular, the "bad" high interference IPMIs for one victim mobile terminal might be a "good" low interference IPMI for another victim mobile terminal. Furthermore, the average SINR might still not be reduced significantly. Also, the SINR estimation uncertainty (i.e. the flashlight effect) based on the CQI measurements can be still very high or even be increased due to the IPMI restriction based on WCI reporting.

This will be exemplified in FIGS. 6 and 7, illustrating the measurement results at the interference victim mobile terminal side as to six different precoders a-f of the interfering base station and their interference power level caused at the mobile terminal (UE). It is assumed that three different UEs 1-3 are located at one cell, and experience inter-cell interference from a neighbour cell, the level of interference depending on the interference precoding matrix (IPMI) used by the base station (eNB) of the neighbour cell. FIG. 6 further illustrates the worst precoding matrix (i.e. WCI) that are reported by the UEs to the network. Accordingly, UE1 reports precoding matrix c, UE2 reports precoding matrix b, and UE3 reports precoding matrix e. As a result of the WCI reporting, the interfering eNB is instructed to restrict the use of precoding matrices (i.e. PMI restriction) such that precoding matrices c, b and e are not used. The resulting inter-cell inteference after PMI (IPMI) restriction is depicted in FIG. 7 for each UE. As apparent therefrom, the interference flashlight effect, resulting from the strongly varying interference level of the various (remaining) precoders, is not significantly reduced.

In a typical heterogeneous network (HetNet) scenario consisting of macro and pico cells (base station), the effective interference power level on the receiver side (I) can be separated into the contribution from a dominant interferer cell ($I_D$) and the contribution from the remaining interferer cells ($I_R$). Both interference power contributions are time-dependent stochastic processes.

$$I(t)=I_D(t)+I_R(t) \tag{1}$$

The following can be assumed for a typical HetNet scenarios, especially as depicted in FIG. 5:

$$I_D(t) \gg I_R(t) \tag{2}$$

Hence, it is reasonable to focus on the interference statistics estimation from the dominant interfering cell (base station). Under the assumption that a dominant interferer uses only a restricted set of precoding matrices, also the interference power levels from that interferer are limited to a certain set of power levels. It is assumed that the interference channel state of the dominant interferer is known on the interference victim mobile terminal side due to measurements of reference symbols (CRS or CSI-RS in case of an LTE system) of the interfering base station.

The interference power level contribution from each single dominant interferer cell (base station) is determined by a function of the interference channel state defined by the M×N matrix $H_D$, where M is the number of receiver antenna ports and N is the number of transmit antenna ports, and the N×L precoding matrix $W_D$, where L is the number of transmitted layers. The precoding matrix $W_D$ consists of L column (beamforming) vectors $w_{Di}$, where each column is the precoding for spatial layer i. The time dependent (depending on subframe n) relation for the interference power level at the receiver input of the interference victim mobile terminal is then given by $$I_D(n) = \sum_{i=1}^{L(n)} \|H_D(n) \cdot w_{D_i}(n)\|^2 \tag{3}$$

where $\|H_D(n)\|$ is the Frobenius Norm of the channel matrix $H_D(n)$. L(n) is the number of spatial layers used by the interferer in subframe n.

In general, mobile terminal has to estimate the expected interference power level for data transmissions in subframe n+1 based on measurements in previous subframes.

A typical approach where the estimated interference power level for subframe n+1 is given by the average of the measured interference power levels of the previous S subframes:

$$\tilde{I}(n+1) = \frac{1}{S} \sum_{i=n-S}^{n} I(n) \quad (4)$$

This approach which is currently used for the channel quality (CQI) reporting in LTE exhibits the following inherent problems:
a) It cannot be distinguished between impact of dominant and remaining interferers.
b) The measuring mobile terminal does not know which precoding matrix (IPMI) has been used by the interferer in which subframe.
c) The measuring mobile terminal cannot distinguish between impact of the channel state and the impact of interference precoding matrix (IPMI) on the interference power level in measured subframes.

The above presented concepts to mitigate inter-cell/intra-cell interference do not take into account the flashlight effect, in other words, the effect that the inter-cell interference may change significantly depending on the precoding matrix used by the interfering base station. This may lead to "wrong" scheduling decisions at the serving base station of the interference victim mobile terminal. This will be explained in more detail below.

Impact of Flashlight Effect

The negative impact of the flashlight effect on scheduling decisions at the serving base station shall be illustrated using two different scenarios.

For ease of explanation the following simple scenario is assumed as illustrated in FIG. 8 Two mobile terminals (UEs), UE1 and UE2, are located in the network of base station 1 (eNB1). A neighbour cell controlled by base station 2 (eNB2) causes inter-cell interference at the cell of base station 1.

UE1 and UE2 each measure the radio channel and report the CQI corresponding to a certain nominal bitrate under the assumption of no transmission errors to the serving eNB1. As apparent from the table of FIG. 9, UE1 measures a mean SINR of 8 dB and reports a quantized CQI of 9 which corresponds to a nominal bitrate of 1.92 bits/symbol under the assumption of a block error rate (BLER) of 0%. UE2 measures a mean SINR of 10 dB and reports a quantized CQI of 10 which corresponds to a nominal bitrate of 2.73 bits/symbol. Correspondingly, eNB1 would schedule UE2 with the higher CQI for the corresponding radio resource to which the CQI refers. However, due to a strong flashlight effect, scheduling UE2 results in an increased BLER of 37% and a throughput of 1.72 (bits/symbol), whereas scheduling UE1 would have resulted in a BLER of 5% and a throughput of 1.82 (bits/symbol). Thus, though UE2 was selected due to the higher reported CQI level, scheduling UE1 would have provided a higher throughput and thus a higher spectral efficiency.

Similarly, in another constellation as depicted in FIG. 10, both UEs measure a mean SINR of 10 dB and consequently report a CQI of 10. As apparent, the CQI reporting does not provide any preference and consequently the base station scheduler may select UE1 and UE2 arbitrarily. However, as shown in FIG. 10, the throughputs achievable by UE1 and UE2 differ significantly, 1.72 vs 2.59.

In another scenario it is assumed that particular IPMI restrictions are applied to particular subframe sets of a radio frame by the interfering base station (eNB). In more detail, the interferer eNB2 of FIG. 8 uses for a first subframe set a first set of precoding matrices, and for a second subframe set it uses a second set of precoding matrices out of all available precoding matrices (PMIs). This is depicted in FIG. 11. The victim UE however does not know which interferer precoding matrix exactly is used by the interfering eNB for a particular subframe.

FIG. 12 illustrates the results of the interference measurements at the victim mobile terminal (UE) for the two different set of interferer precoding matrices, IPMI set A and IMPI set B of FIG. 11. Assuming that both IPMI sets consist of four different precoding matrices each, the mobile terminal measures the interference levels as depicted in FIG. 12. As apparent therefrom, the average interference level measured for IPMI set A is lower than the one estimated for IPMI set B. The average interference level is the basis of the classic CQI report transmitted to the base station (eNB). Thus, IMPI set A (used by eNB2 for subframe set A) seems to be more beneficial than IMPI set B (used by eNB2 for subframe set B). eNB1 now has to decide on which subframe the UEs should be scheduled to maximize the throughput and the spectral efficiency. Consequently, eNB1 would estimate that interference levels at subframes of subframe set A are expected to be lower than for the subframes of the other subframe set B. Thus, eNB1 would schedule UEs preferably at the resources of subframe set A to avoid the higher average interference level in subframe set B caused by the IPMI set B. However, subframe set B would actually be a better choice due to the lower interference variance (i.e. flashlight effect).

FIG. 13 illustrates interference level graphs for four different IPMIs out of a particular IPMI set. The UE measures particular interference samples during a measurement window in order to estimate the interference statistics within the transmission window in which each IPMI might be used with the same probability. As apparent from FIG. 13, six samples are taken at different timings in the measurement window. A sample corresponds to a PDSCH transmission in the interfering cell with an unknown IPMI. Different IPMI were used by the interfering eNB at the point of time where the samples are taken by the measuring interference victim UE. It is assumed that two samples are taken for IPMI a, b and c, whereas no sample was taken for IPMI d, since same was not used by the interfering eNB within the measurement window. This results in a measured interference variability (range) as depicted in FIG. 13, referring to the min and max of the measurement interference level of the various samples. This measured interference variability could be taken as an estimation for the transmission window.

Further marked in FIG. 13 is the real interference variability (range) that may be experienced in the transmission window, which depends on the min and max of the interference graphs in the transmission window. As apparent, the interference estimation for the transmission window significantly differs from the actual interference variability; flashlight effect is actually much stronger than can be expected from the measurement samples in the measurement window.

SUMMARY OF THE INVENTION

The present invention strives to avoid the various disadvantages mentioned above.

One object of the invention is to propose a mechanism for determining a more reliable quality measure of a precoding matrix set.

The object is solved by the subject matter of the independent claims. Advantageous embodiments are subject to the dependent claims.

According to a first aspect, the invention suggests a method for determining a quality measure of a precoding matrix set. In more detail, the following scenario is assumed in which a mobile terminal is located in a cell (network) controlled by a serving station. A neighbour cell is controlled by an interferer base station. Intercell interference occurs between the two neighbouring cells, and the mobile terminal accordingly experiences such an intercell interference. Furthermore, the set of precoding matrices usable by the inteferer base station is restricted in order to mitigate the intercell interference at the mobile terminal. In other words, the interferer base station is allowed to use only a set of precoding matrices out of all possible precoding matrices of the precoding codebook. Apart from the precoding matrix set restriction, the scheduling is not coordinated between the interfering cells. This means that one base station (cell) does not know which precoding matrix is used by the interfering cell at which time.

Prior art systems may generally report the average interference from the interferer base station experienced by the mobile terminal. Correspondingly, the mobile terminal may measure the interference at particular times within a measurement window (usually several subframes) without knowing which precoding matrices have been actually used by the interferer base station, and then reports the calculated average interference experienced during the measurement window to the serving base station. This is however not sufficient in many scenarios and might lead to unfavourable scheduling decisions in the serving base station; for example the strongly varying interference caused by different precoding matrices of the precoding matrice set causes a flashlight effect and introduces a high degree of uncertainty regarding the average interference measured and calculated by the mobile terminal since the interference victim mobile terminal has no information about which precoding matrix from the restricted set might be used in which subframe by the interfering base station.

The invention strives to implement a mechanism which allows circumventing this problem as follows.

The mobile terminal is informed by its serving base station about the particular precoding matrices of which the precoding matrix set used by the interferer base station is composed. The mobile terminal may be constantly measuring the radio channel to the interferer base station, and using the measurements of the current channel state, the mobile terminal can estimate the interferences that would be caused by each of the precoding matrices of the precoding matrix set at the mobile terminal. In other words, the mobile terminal estimates the interference of every precoding matrix of the precoding matrix set at the mobile terminal based on the current channel state (e.g. of one subframe), instead of measuring the actually experienced interference during a past time (measurement window).

Based on the various interference estimations, one for every precoding matrix, the mobile terminal can determine the interference variability of the precoding matrix set, and use same as a quality measure to evaluate the precoding matrix set. Thus, the interference flashlight effect can be predicted within a single subframe and further based on the current channel state, and not on previous channel states.

The interference variability as quality measure, in addition or as a substitute to e.g. the average interference of the precoding matrix set, allows to more accurately evaluate the interference that is (or will be) caused by the interferer base station using this precoding matrix set.

This information can be used in a variety of ways, of which only a few will be explained in the following.

According to one embodiment of the invention, the interference variability is transmitted from the mobile terminal to its serving base station as a quality measure for the precoding matrix set. Accordingly, the serving base station may use this additional information to improve the scheduling for the mobile terminal. For instance, in addition to the channel quality information reported to the serving base station from the mobile terminal, the serving station can consider the interference variability to decide whether to schedule this mobile terminal or another mobile terminal for which the intercell interference impact from the interferer base station is less. Alternatively or in addition, the serving base station can select the modulation and coding scheme based on the reported interference variability when scheduling a downlink transmission to the mobile terminal.

According to another embodiment of the invention, the interference variability is used to determine a preferred precoding matrix set out of a plurality of precoding matrix sets to be used by an interferer base station. In particular, it is assumed that the mobile terminal is provided with information on a plurality of precoding matrix sets and their corresponding precoding matrices. Using the estimated interference variability as additional quality measure for the various precoding matrix sets, it is possible to determine a preferred matrix set that shall be used by the interferer base station to cause as few interference as possible at the mobile terminal and with a low variability; the determination may be done either at the mobile terminal, the serving base station or the interferer base station.

The present invention provides a method for determining a quality measure of at least one precoding matrix set usable for downlink data transmissions by an interferer base station in a mobile communication system. A mobile terminal is located in the cell of a serving base station and experiences intercell interference from a neighbour cell controlled by the interferer base station. According to the method, the mobile terminal is informed by the serving base station about the particular precoding matrices in the at least one precoding matrix set usable by the interferer base station. The mobile terminal then measures the current channel state of the channel between the interferer base station and the mobile terminal, and estimates the interference from each of the precoding matrices of the at least one precoding matrix set based on the measured current channel state. An interference variability of the at least one precoding matrix set is determined as a quality measure for the at least one precoding matrix set based on the estimated precoding matrix interferences.

According to an advantageous embodiment of the invention which can be used in addition or alternatively to the above, the step of informing the mobile terminal about the particular precoding matrices in the at least one precoding matrix set is performed by using messages of the physical layer, the media access control layer or higher layers. Additionally or alternatively, the step of informing informs the mobile terminal about weighting information regarding the usage probability of each precoding matrix of the at least one precoding matrix set usable by the interferer base station. Correspondingly, the weighting information may be preferably used by the mobile terminal in the step of determining the interference variability of the at least one precoding matrix set.

According to an advantageous embodiment of the invention which can be used in addition or alternatively to the above, a mean interference is calculated based on the estimated precoding matrix interferences. The calculated mean interference is included into the quality measure of the at least one precoding matrix set in addition to the interference variability. Preferably, the weighting information is used by the mobile terminal in the step of calculating the mean interference.

According to an advantageous embodiment of the invention which can be used in addition or alternatively to the above, the interference variability is at least one of the following: 1) a standard deviation of the interference from all precoding matrices of the at least one precoding matrix set, 2) variance of the interference from all precoding matrices of the at least one precoding matrix set, 3) minimum and/or maximum interference of any of the precoding matrices of the at least one precoding matrix set, 4) a range of the interferences from all precoding matrices of the at least one precoding matrix set, being preferably the difference between the maximum and minimum interference of any of the precoding matrices of the at least one precoding matrix set.

According to an advantageous embodiment of the invention which can be used in addition or alternatively to the above, the quality measure of the at least one precoding matrix set is reported from the mobile terminal to the serving base station, preferably within a channel quality report message. The reported quality measure of the at least one precoding matrix set is considered for scheduling decisions at the serving base station.

According to an advantageous embodiment of the invention which can be used in addition or alternatively to the above, the serving base station schedules the mobile terminal for particular subframes of a radio frame based on the reported quality measure of the precoding matrix set, or selects a modulation and coding scheme for a transmission to the mobile terminal based on the reported quality measure of the precoding matrix set.

According to an advantageous embodiment of the invention which can be used in addition or alternatively to the above, at least two precoding matrix sets are predefined one of which is to be used by the interferer base station, and the steps of informing, estimating and determining are performed for each of the at least two precoding matrix sets.

The mobile terminal determines a preferred precoding matrix set out of the at least two precoding matrix sets, based on the determined quality measure of the at least two precoding matrix sets, and reports information on the preferred precoding matrix set from the mobile terminal over the serving base station to the interferer base station.

Alternatively, the determined quality measure of the at least two precoding matrix sets is reported from the mobile terminal to the serving base station. Then, the serving base station determines a preferred precoding matrix set out of the at least two precoding matrix sets, based on the reported quality measure of the at least two precoding matrix sets. The serving base station then reports information on the preferred precoding matrix set to the interferer base station.

Alternatively, the mobile terminal calculates a difference between the quality measures of the two precoding matrix sets, and reports information on the difference to the serving base station. The serving base station determines a preferred precoding matrix set out of the at least two precoding matrix sets, based on the reported difference, and reports information on the preferred precoding matrix set to the interferer base station.

According to an advantageous embodiment of the invention which can be used in addition or alternatively to the above, a radio frame of the communication system is divided into at least two subframe sets. For each subframe set of the radio frame a different precoding matrix set is configured at the interferer base station. The steps of informing, estimating and determining are performed for each precoding matrix set. Furthermore, the step of informing further comprises informing the mobile terminal about the correspondence of each precoding matrix set to a subframe set.

According to an advantageous embodiment of the invention which can be used in addition or alternatively to the above, different precoding matrix sets are configured for different subband and/or combination of subbands and subframes. The steps of informing, estimating and determining are performed for each subband and/or combination of subbands and subframes.

The present invention further provides a mobile terminal for determining a quality measure of at least one precoding matrix set usable for downlink data transmissions by an interferer base station in a mobile communication system. The mobile terminal is located in the cell of a serving base station and experiences intercell interference from a neighbour cell controlled by the interferer base station. A receiver of the mobile terminal receives information from the serving base station about the particular precoding matrices in the at least one precoding matrix set usable by the interferer base station. A processor of the mobile terminal and the receiver measure the current channel state of the channel between the interferer base station and the mobile terminal. The processor estimates the interference from each of the precoding matrices of the at least one precoding matrix set based on the measured current channel state. The processor determines an interference variability of the at least one precoding matrix set as a quality measure for the at least one precoding matrix set based on the estimated precoding matrix interferences.

According to an advantageous embodiment of the invention which can be used in addition or alternatively to the above, the receiver receives information about weighting information regarding the usage probability of each precoding matrix of the at least one precoding matrix set usable by the interferer base station. The processor uses the weighting information for determining the interference variability of the at least one precoding matrix set.

According to an advantageous embodiment of the invention which can be used in addition or alternatively to the above, the processor calculates a mean interference based on the estimated precoding matrix interferences. The calculated mean interference is included into the quality measure of the at least one precoding matrix set in addition to the interference variability. The processor preferably uses the weighting information for calculating the mean interference.

According to an advantageous embodiment of the invention which can be used in addition or alternatively to the above, the transmitter reports the quality measure of the at least one precoding matrix set to the serving base station, preferably within a channel quality report message.

According to an advantageous embodiment of the invention which can be used in addition or alternatively to the above, at least two precoding matrix sets are predefined one of which is to be used by the interferer base station. The receiver and processor perform the receiving, estimating and determining for every precoding matrix set out of the at least two precoding matrix sets.

The processor determines a preferred precoding matrix set out of the at least two precoding matrix sets, based on the determined quality measure of the at least two precoding matrix sets. The transmitter reports information on the preferred precoding matrix set over the serving base station to the interferer base station.

Alternatively, the transmitter reports the determined quality measure of the at least two precoding matrix sets to the serving base station.

Alternatively, the processor calculates a difference between the quality measures of the two precoding matrix sets, and the transmitter reports information on the difference to the serving base station.

According to an advantageous embodiment of the invention which can be used in addition or alternatively to the above, a radio frame of the communication system is divided into at least two subframe sets. For each subframe set of the radio frame a different precoding matrix set is configured at the interferer base station. The receiver and processor perform the receiving, estimating and determining for each precoding matrix set. The receiver receives information about the correspondence of each precoding matrix set to a subframe set.

According to an advantageous embodiment of the invention which can be used in addition or alternatively to the above, different precoding matrix sets are configured for different subband and/or combination of subbands and subframes. The receiver and processor perform the receiving, estimating and determining for each subband and/or combination of subbands and subframes.

The present invention further provides a serving base station for determining a quality measure of at least one precoding matrix set usable for downlink data transmissions by an interferer base station in a mobile communication system. A mobile terminal is located in the cell of the serving base station and experiences intercell interference from a neighbour cell controlled by the interferer base station. A transmitter of the serving base station informs the mobile terminal about the particular precoding matrices in the at least one precoding matrix set usable by the interferer base station. The mobile terminal estimates the interference from each of the precoding matrices of the at least one precoding matrix set based on a measured current channel state, the channel being between the interferer base station and the mobile terminal. A receiver of the serving base station receives information from the mobile terminal about the estimated interference for each of the precoding matrices of the at least one precoding matrix set. A processor of the serving base station determines an interference variability of the at least one precoding matrix set as a quality measure for the at least one precoding matrix set based on the received estimated precoding matrix interferences.

According to an advantageous embodiment of the invention which can be used in addition or alternatively to the above, the receiver receives weighting information regarding the usage probability of each precoding matrix of the at least one precoding matrix set usable by the interferer base station. The processor determines the interference variability of the at least one precoding matrix set based on the receieved weighting information.

According to an advantageous embodiment of the invention which can be used in addition or alternatively to the above, the processor schedules the mobile terminal for particular subframes of a radio frame based on the determined interference variability of the precoding matrix set. In addition or alternatively, the processor selects a modulation and coding scheme for a transmission to the mobile terminal based on the determined interference variability of the precoding matrix set.

According to an advantageous embodiment of the invention which can be used in addition or alternatively to the above, at least two precoding matrix sets are predefined one of which is to be used by the interferer base station. The transmitter, receiver and processor respectively perform the informing, receiving and determining for each of the at least two precoding matrix sets. The processor determines a preferred precoding matrix set out of the at least two precoding matrix sets, based on the determined quality measure of the at least two precoding matrix sets. The transmitter reports information on the preferred precoding matrix set to the interferer base station.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to radio access scheme according to 3GPP LTE (Release 8/9) and LTE-A (Release 11) mobile communication systems, partly discussed in the Technical Background section above. It should be noted that the invention may be advantageously used for example in a mobile communication system such as 3GPP LTE-A (Release 11) communication systems as described in the Technical Background section above, but the invention is not limited to its use in this particular exemplary communication networks. The invention may be for example used in non-3GPP system such as WIMAX.

One aspect of the invention is to determine a more meaningful quality measure for a precoding matrix set that might be used by an inteferer base station in a neighbouring cell. It is assumed that the interfering base station applies an precoding matrix (IPMI) restriction to reduce intercell interference on the cell of a victim mobile terminal. In particular, only certain precoding matrices composing a precoding matrix set are used by the interferer base station for transmissions in its cell, i.e. PDSCH transmissions.

A basic embodiment of the invention is explained with reference to FIG. 14, which is a signaling diagram illustrating the various steps of the embodiment of the invention.

As apparent therefrom, the serving base station, being the base station controlling the cell in which the victim mobile terminal is located, reports information on the IPMI set that can be used by the interferer base station, to the victim mobile terminal. The serving base station is previously informed about the IPMI set(s) used by the interfering base stations via signaling over the X2 interface between the different base stations.

The reporting to the victim mobile terminal could be accomplished for example by using a bitmap to identify the particular precoding matrices out of a given precoding codebook of which the precoding matrix set is composed of. Alternatively, the index of the precoding matrices in the precoding codebook could be directly reported from the serving base station to the mobile terminal. In any case, the mobile terminal knows all the precoding matrices that the interferer base station uses and which influence the intercell interference experienced at the mobile terminal.

Figure 14:
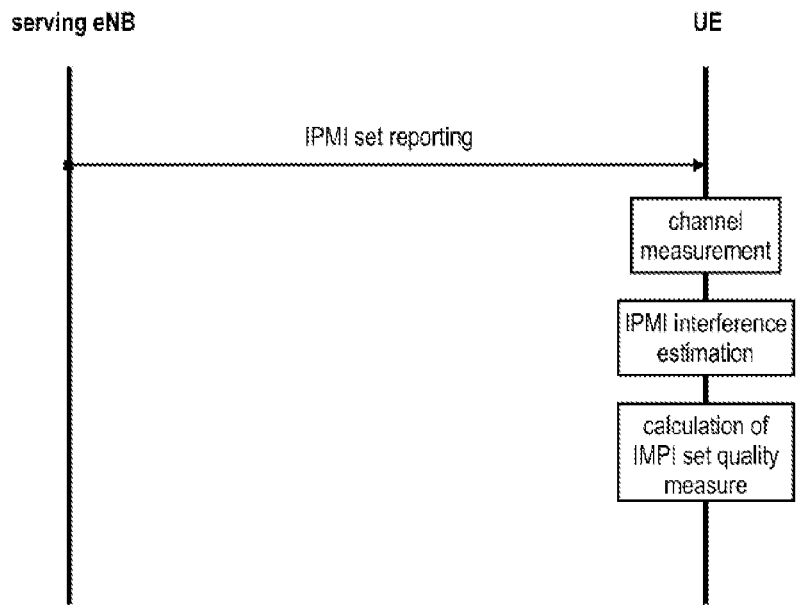
FIG. 14 is a signaling diagram showing the messages and steps performed for one embodiment of the invention.

The next step as depicted in FIG. 14 is the channel measurements performed at the mobile terminal. In more detail, the interference radio channel $H_D$ between the dominant interferer base station and the interference victim mobile terminal can be measured at the mobile terminal. Known reference signals, which do not carry any data, can be used to measure the channel. The matrix $H_D$ is an M×N matrix, where M is the number of receiver antenna ports and N is the number of transmit antenna ports.

In LTE each base station periodically transmits cell-specific reference symbols, often referred to as "common" reference symbols as they are available to all mobile terminals (UEs) in a cell. A second type of reference symbol refers to dedicated reference symbols, which may be specific to the mobile terminal and thus be embedded in the data for this specific mobile terminal (UE-specific RS).

A further possibility is the use of CSI-RS (Channel State Information Reference Symbols) for determining the downlink channel state between interfering base station and interference victim mobile terminal. The CSI-RS haven been introduced for LTE Release 10 in order to increase the accuracy of the channel state information acquisition for example for inter-cell channel measurements. Further the CSI-RS can be used the measure the CSI in case a cell is operated without CRS.

The radio channel measurements are performed within a measurement window of one subframe. The radio channel measurements may be performed periodically in the UE or might be triggered by certain events, such as the reception of IPMI set information.

Nevertheless, other forms of channel estimation may be possible as well, and the present invention shall not be limited to the above-described channel estimation at the mobile terminal based on reference symbols transmitted by the interferer base station.

Subsequently, the mobile terminal can use the measured channel state matrix $H_D$ to estimate the interference that would be caused by each of the precoding matrices of the precoding matrix set. In more detail, the interference power level $I_{IPMI}$ at the input of the receivers that would be caused by a certain precoding matrix (IPMI) for the current interference channel state is given by:

$$I_{IPMI_i}(n) = \sum_{l=0}^{L_{IMPI_i}} \left\| H_D(n) \cdot w_{IPMI_{i,l}} \right\|^2 \quad (5)$$

$L_{IPMIi}$ is the number of spatial layers (columns of precoding vectors) of particular precoding matrix i from the IPMI set used by the interferer base station in subframe n. The above equation takes into account that each spatial layer on the interferer side contributes to the interference power level at the receiver side, i.e. mobile terminal. $\|A\|$ is the Frobenius Norm of matrix A. $w_{IPMIi,l}$ is one vector of the precoding matrix W (N×L), consisting of L column (beamforming) vectors where each column is the precoding for spatial layer l.

As explained above, the interference radio channel $H_D$ is measured for subframe n. Furthermore, the IPMI set reporting done in the previous step allows the mobile terminal to know which precoding matrices are actually used by the interferer base station; therefore, the mobile terminal knows the vectors $w_{IPMIi,l}$.

The mobile terminal thus estimates for each IPMI i the interference power level $I_{IPMI}$ using equation (5), i.e. summing the product of the current channel state and precoding vector for all spatial layers. As a result, the mobile terminal gets interference estimations for each precoding matrix of the precoding matrix set, in other words, an interference power level set corresponding to the precoding matrix set.

Figure 13:
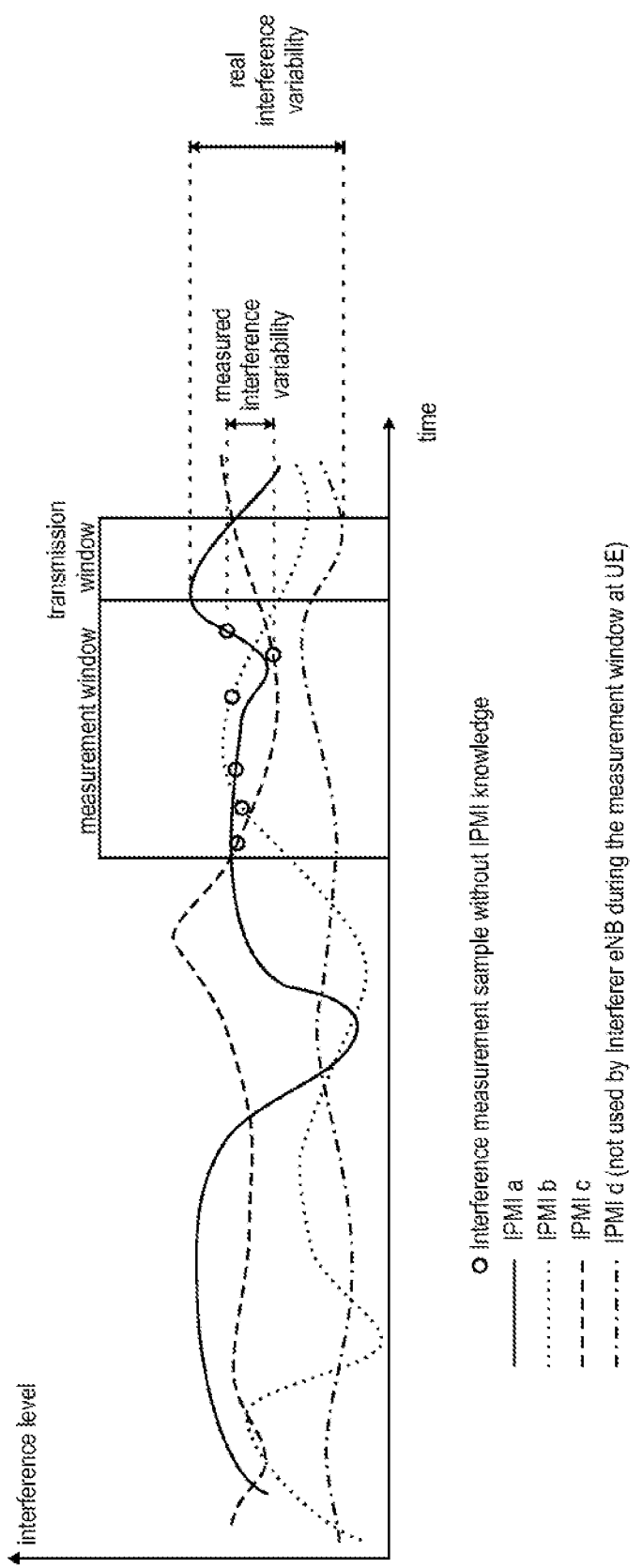
FIG. 13 illustrates interference graphs for four different IPMIs, and depicts the measurement window during which the UE measures the interference caused by the interferer eNB using the four IPMIs.
Figure 15:
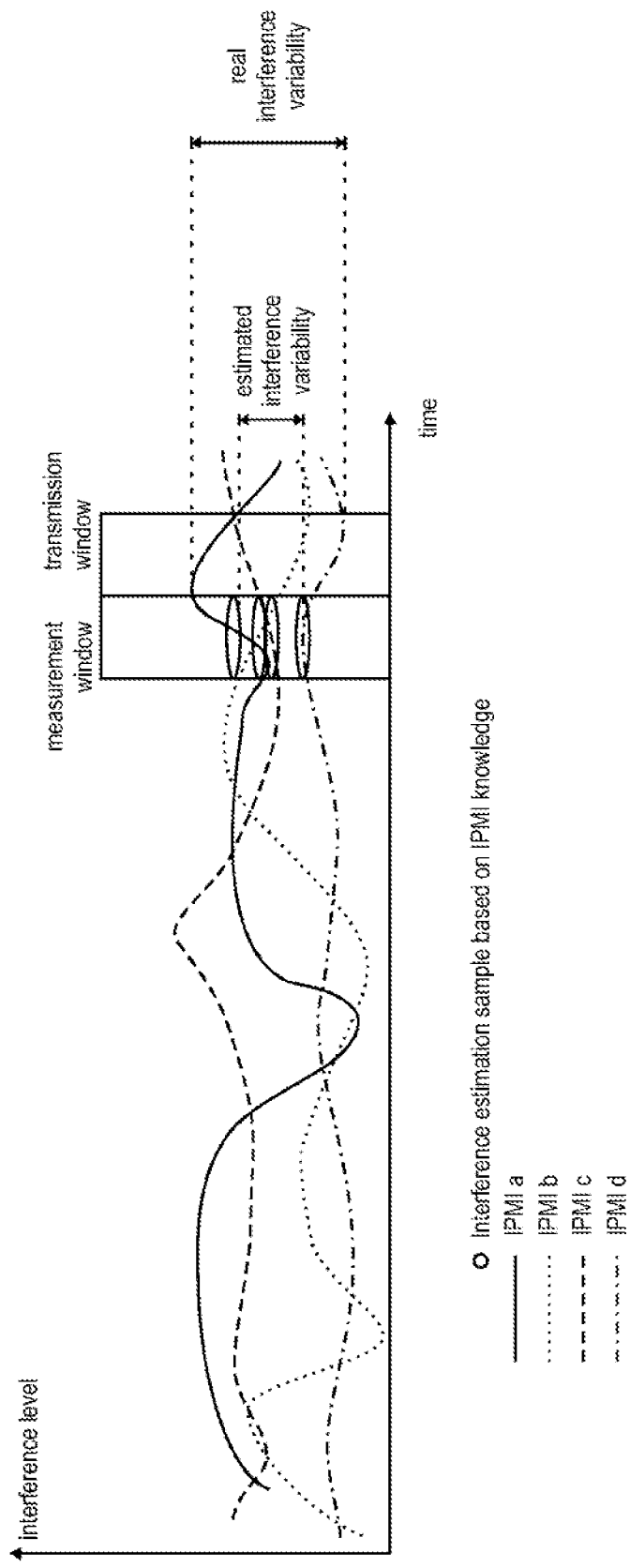
FIG. 15 illustrates the same interference graphs for four different IPMIs of FIG. 13, and depicts the measurement window on which basis the radio channel is measured and then the interference variability is estimated according to one embodiment of the invention.

This is depicted in FIG. 15, showing the four interference graphs already known from FIG. 13. As apparent from a comparison of the two figures, the measurement window of FIG. 15 is much shorter than in the measurement of the prior art, namely one subframe long. Furthermore, the mobile terminal estimates an interference level for each of the four precoding matrices, whereas in the prior art as explained in connection with FIG. 13, IMPI d was actually not used by the interfering base station during the measurement window and was thus not properly considered. Thus, in the estimation process of equation (5) according to one embodiment of the invention, the influence of each precoding matrix is estimated. Since the current radio channel is used for estimation and the measurement window is rather short, the estimation results more accurately reflect the interference to be expected from the various precoding matrices. This is especially true for fast changing channels. As a result, the estimated interference variability as depicted in FIG. 15 is much more accurate with respect to the interferences that are really to be expected.

The set of estimated interference power levels for the current interference channel state can be described by:

$$I_{IPMI} = I_{IPMI_0} \cup I_{IPMI_1} \cup \ldots \cup I_{IPMI_R} \quad (6)$$

Based on the estimation results, the mobile terminal may now calculate a quality measure for the precoding matrix set including the interference variability of the various precoding matrices so as to properly reflect the interference flashlight effect caused by the various precoding matrices.

The interference variability can be expressed in different ways. One possibility is the variance of the inteferences estimated for the various precoding matrices of the precoding matrix set. The variance is a measure of how far the interferences are spread out from each other, in particular how far the interferences are apart from the mean value of the interferences. Another option is to calculate the standard deviation of all interferences as the interference variability of the precoding matrix set. Still another option is to determine the minimum and/or maximum interference values out of all estimated interference values, as the interference variability of the precoding matrix set. Based on this minimum/maximum interference values, it is also possible to calculate the range of interference values, such that the interference variability is reflected by the interference value range. Also, it is possible to use a combination of two or more of the above options to indicate the interference variability of the precoding matrix set.

The quality measure may contain further information in addition to the interference variability as explained above. For example, the mobile terminal may calculate the mean interference value out of all estimated interferences of the various precoding matrices of the precoding matrix set. The mean interference value can also used as a quality indication of the precoding matrix set and may by included in the quality measure.

It should be noted that the mean interference value mentioned above, is not necessarily the same as the mean interference that a mobile terminal reports to its serving base station in the channel quality report. The latter one refers to the mean interference calculated from the measured interference (see FIG. 13), where e.g. not every precoding matrix might be considered and where the long measurement window may introduce significant errors with a fast changing channel where the impact of the current channel state is lost due to the long measurement window. In contrast thereto, the mean interference estimated based on the current channel conditions and with knowledge of all the precoding matrices of the precoding matrix set, is more accurate and allows an immediate interference prediction.

Using the interference variability as a quality measure for the precoding matrix set allows considering the flashlight effect of the precoding matrix set on the mobile terminal. Especially, in combination with either the measured average interference of the CQI report or the estimated average interference the interference impact of the precoder matrix set on the mobile terminal can be evaluated with more accuracy and reliability.

The interference variability may be also encoded in various ways for further processing. For example, the interference variability may be quantized in the mobile terminal and mapped to different code points on a transmitted code word.

In the above, only one precoding matrix set is mentioned for illustration purposes only. Of course, the above explained principles are equally applicable when the interferer base station uses several precoding matrix sets. In said case, the steps illustrated and explained in connection with FIG. 14 are performed together or separately for each precoding matrix set.

Similarly, though only one (dominant) interferer base station is considered up to now, the above principles are equally applicable to scenarios where intercell interference of various interferers shall be considered. In said case, each interferer base station may use one or more different precoding matrix sets. The mobile terminal needs to measure the radio channel to each of the interferer base stations, and estimate the interference of each precoding matrix based on the corresponding interference radio channel, according to the explained above.

According to other embodiments of the invention, the interferer base station uses different precoding matrix sets for different subframe sets. More specifically, the time-frequency resources are divided in a radio frame composed of various subframes. In LTE, the radio frame is 10 ms, with 10 subframes each 1 ms long. For example, it may be assumed that a base station uses a particular precoder matrix set for certain subframes only, whereas for the remaining subframes another precoder matrix set is used by the interfering base station. In such a case, a victim mobile terminal experiences different intercell interference for every subframe set and for every precoding matrix in the precoding matrix set corresponding to the subframe set. Therefore, it is advantageous to learn the interference variability to be caused in every subframe and for every precoding matrix set.

Furthermore, the interfering base station (eNB) may apply different IPMI restrictions on different subbands or combinations of subbands and subframes. The interference victim mobile terminal (UE) estimates the impact of the interference in the various subbands/subframes as explained above.

According to a further embodiment of the invention, each of the precoding matrices in a precoding matrix set is assigned a particular weighting factor, which for example corresponds to the usage probability of said precoding matrix by the interferer base station. In more detail, it may be assumed that the interferer base station does not use each precoding matrix of a precoding matrix set the same amount of times. On the contrary, it seems more probable that particular precoding matrices of a precoding matrix set are used by the interferer base station more often than others. Correspondingly, precoding matrices that are more often used than others naturally have more impact on the interference.

It should be noted that the weighting factors may not only refer to the usage probability of a precoding matrix by the interferer base station, but may alternatively refer to other aspects related to the various precoding matrices of a precoding matrix set.

In order to consider this aspect, weighting factors may be introduced in the step of reporting the IPMIs from the serving base station to the mobile terminal.

$$\sum_{i=0}^{R} \gamma_i = 1 \qquad (7)$$

The introduction of the weighting factors changes the determination of both mean and standard deviation of the IPMI set interference statistic in the following way:

$$\text{mean}(I_{IPMI}) = \sum_{i=0}^{R-1} \gamma_i \cdot I_{IPMI_i} \qquad (8)$$

$$\text{std}(I_{IPMI}) = \sqrt{\sum_{k=0}^{R-1} \gamma_k \cdot \left( I_{IPMI_i} - \left( \sum_{k=0}^{R-1} \gamma_i \cdot I_{IPMI_i} \right) \right)^2} \qquad (9)$$

The different weighting factors are reported to the interference victim mobile terminal. The serving base station may be informed about the various precoding matrices of a precoding matrix set used by the interferer base station and is additionally informed about the weighting of each of these precoding matrices on the network side via signaling over the X2 interference between the different base stations. Then, the serving base station may forward this information to the mobile terminal, including e.g. a list of IPMIs (i.e. precoding matrices) and quantized weighting factors $\gamma_i$.

In the following exemplary embodiment a code point mapping for the IPMI weighting factors will be explained.

| Code Point | Mapping A | Mapping B |
|---|---|---|
| 0 0 | $\gamma_i = 0.10$ | $\gamma_i = 0.25 \times 1/R$ |
| 0 1 | $\gamma_i = 0.20$ | $\gamma_i = 0.5 \times 1/R$ |
| 1 0 | $\gamma_i = 0.30$ | $\gamma_i = 1.0 \times 1/R$ |
| 1 1 | $\gamma_i = 0.50$ | $\gamma_i = 2.0 \times 1/R$ |

For this embodiment of the invention it is assumed that the weighting factor is reported with 2 bits, thus allowing four different kind of weighting factors for each precoding matrix. For instance, when using Mapping B, the weighting factors directly depend on the IPMI set size R. Furthermore, for code point [1 1] the weighting of one IPMI can be increased.

Thus, the mobile terminal learns for every precoder matrix the corresponding weighting factor that shall be considered.

The above embodiments of the invention allow the mobile terminal to calculate the interference variability as a quality measure for one or more precoding matrix sets and if necessary referring to various interferer base stations. This information can be used in many ways, some of which will be now explained in more detail.

Figures 16, 17, 18:
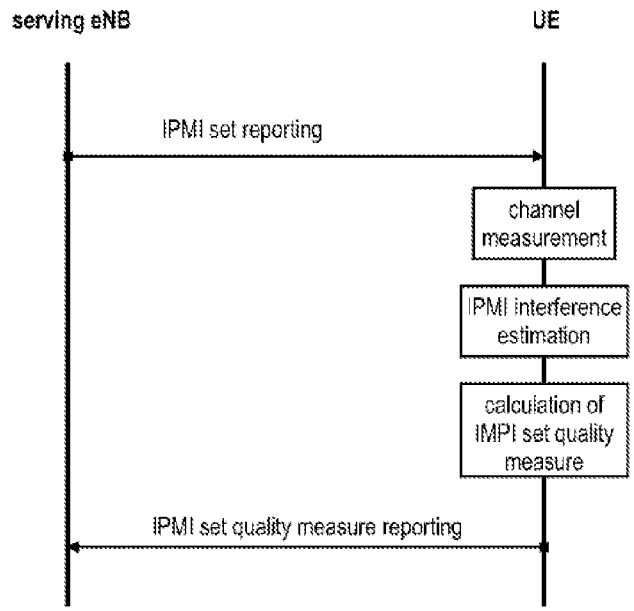
FIG. 16 is a signaling diagram showing the messages and steps performed for one embodiment of the invention.
FIGS. 17 and 18 show two tables, each indicating the measurement results and estimation results regarding CQI and interference variability, further indicating the resulting BLER and throughput achieved.

According to an embodiment of the invention, the interference variability as a quality measure for a precoding matrix set may be used to improve the scheduling at the serving base station. In this case for example the interference variability may be either the interference range (max(IPMI)-min(IPMI)) or the standard deviation. FIG. 16 illustrates the additional step of reporting the IPMI set quality measure from the mobile terminal to the serving base station.

For reporting the quality measure to the serving base station, the quality measure may be quantized and mapped onto a set of B bits. These bits can be used to distinguish $B^2$ interference variability states (code points). The assignment of the quality measure values to these states (code points) can be done by a table or by means of a closed mathematical expression.

As an example the following table illustrates a possible code point mapping for the IPMI set interference variability, in particular possible quantization mappings for the interference level standard deviation or interference range.

| Code Point | Mapping A | Mapping B | Mapping C |
|---|---|---|---|
| 0 0 | $I_v \leq 1.0$ dB | $I_v \leq 1.0$ dB | $I_v \leq 1.0$ dB |
| 0 1 | 1.0 dB $< I_v \leq 2.5$ dB | 1.0 dB $< I_v \leq 3.0$ dB | 1.0 dB $< I_v \leq 3.0$ dB |
| 1 0 | 2.5 dB $< I_v \leq 4.0$ dB | 3.0 dB $< I_v \leq 5.0$ dB | 3.0 dB $< I_v \leq 6.0$ dB |
| 1 1 | 4.0 dB $< I_v$ | 5.0 dB $< I_v$ | 6.0 dB $< I_v$ |

As apparent, B=2 bits are used for quantization which results in $2^2=4$ possible states (code points). Three different exemplary mappings are depicted above, where mappings A and B are based on equidistant quantization interval borders (1.5 dB and 2.0 dB intervals, respectively). Mapping C is an example for a non-uniform mapping of interference variability values onto code points. The granularity of the quantization is reduced for large variability values, unless for bits B are used to quantize same.

Due to the small number of required bits for the above interference variability reporting, it is possible to extend existing CQI reporting formats in LTE without significant performance degradation in terms of error rate and signaling overhead as will be explained in the following. According to one embodiment of the invention, the IMPI set quality measure reporting may be implemented together with the channel quality reports as defined by LTE.

In particular, the reporting of the IPMI set quality measure may be done based on PUCCH or PUSCH.

The reporting may be based on a new PUCCH reporting type. The reporting types currently defined by the current LTE specification (TS 36.213) are summarized in the following table.

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 2 | Wideband CQI/PMI | 2 antenna ports RI = 1 | 6 | 6 | NA | NA |
|   |   | 4 antenna ports RI = 1 | 8 | 8 | NA | NA |
|   |   | 2 antenna ports RI > 1 | 8 | 8 | NA | NA |
|   |   | 4 antenna ports RI > 1 | 11 | 11 | NA | NA |
| 2a | Wideband first PMI | 8 antenna ports RI < 3 | NA | 4 | NA | NA |
|   |   | 8 antenna ports 2 < RI < 8 | NA | 2 | NA | NA |
|   |   | 8 antenna ports RI = 8 | NA | 0 | NA | NA |
| 2b | Wideband CQI/ second PMI | 8 antenna ports RI = 1 | 8 | 8 | NA | NA |
|   |   | 8 antenna ports 1 < RI < 4 | 11 | 11 | NA | NA |
|   |   | 8 antenna ports RI = 4 | 10 | 10 | NA | NA |
|   |   | 8 antenna ports RI > 4 | 7 | 7 | NA | NA |
| 2c | Wideband CQI/first PMI/ second PMI | 8 antenna ports RI = 1 | 8 | NA | NA | NA |
|   |   | 8 antenna ports 1 < RI ≤ 4 | 11 | NA | NA | NA |
|   |   | 8 antenna ports 4 < RI ≤ 7 | 9 | NA | NA | NA |
|   |   | 8 antenna ports RI = 8 | 7 | NA | NA | NA |
| 3 | RI | 2/4 antenna ports, 2-layer spatial multiplexing | 1 | 1 | 1 | 1 |
|   |   | 8 antenna ports, 2-layer spatial multiplexing | 1 | NA | NA | NA |
|   |   | 4 antenna ports, 4-layer spatial multiplexing | 2 | 2 | 2 | 2 |
|   |   | 8 antenna ports, 4-layer spatial multiplexing | 2 | NA | NA | NA |
|   |   | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
|   |   | 8 antenna ports, 4 and 8-layer spatial multiplexing | 5 | | | |
| 6 | RI/PTI | 8 antenna ports, 2-layer spatial multiplexing | NA | 2 | NA | NA |
|   |   | 8 antenna ports, 4-layer spatial multiplexing | NA | 3 | NA | NA |
|   |   | 8 antenna ports, 8-layer spatial multiplexing | NA | 4 | NA | NA |

The modes in the table describe different combinations of PMI and CQI reporting:
Mode 1-0: no PMI; wideband CQI
Mode 1-1: single PMI: wideband CQI
Mode 2-0: no PMI: subband CQI (UE selected)
Mode 2-1: single PMI: subband CQI (UE selected)

For the reporting of the IPMI set quality measure (e.g. interference variability only), the above may be extended with a Reporting Type 7 as follows:

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 7 | IPMI Set Interference Variability | Independent of transmission mode in the serving cell | B | B | B | B |

B is the number of bits that are used to encode the quality measure, e.g. the interference variability only.

The PUCCH-based periodic reporting of the IPMI set quality measure can be configured (as to reporting interval and start of reporting) independent of the transmission mode dependent CSI reporting for the channel between the serving base station and the mobile terminal.

Another option on how to report the IPMI set interference variability is in form of modifications of existing PUCCH reporting types that convey CQI information. The modified PUCCH reporting types according to another embodiment of the invention are given in the following table:

| PUCCH Reporting Type | Reported | Mode State | PUCCH ReportingModes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1-I | Sub-band CQI/IPMI | RI = 1 | NA | 4 + L + B | NA | 4 + L + B |
| | | RI > 1 | NA | 7 + L + B | NA | 4 + L + B |
| 1a-I | Sub-band CQI/second PMI/IPMI | 8 antenna ports RI = 1 | NA | 8 + L + B | NA | NA |
| | | 8 antenna ports 1 < R < 5 | NA | 9 + L + B | NA | NA |
| | | 8 antenna ports RI > 4 | NA | 7 + L + B | NA | NA |
| 2-I | Wideband CQI/PMI/ IPMI | 2 antenna ports RI = 1 | 6 + B | 6 + B | NA | NA |
| | | 4 antenna ports RI = 1 | 8 + B | 8 + B | NA | NA |
| | | 2 antenna ports RI > 1 | 8 + B | 8 + B | NA | NA |
| | | 4 antenna ports RI > 1 | 11 + B | 11 + B | NA | NA |
| 2b-I | Wideband CQI/second PMI/IPMI | 8 antenna ports RI = 1 | 8 + B | 8 + B | NA | NA |
| | | 8 antenna ports 1 < RI < 4 | 11 + B | 11 + B | NA | NA |
| | | 8 antenna ports RI = 4 | 10 + B | 10 + B | NA | NA |
| | | 8 antenna ports RI > 4 | 7 + B | 7 + B | NA | NA |
| 2c-I | Wideband CQI/first PMI/second PMI/IPMI | 8 antenna ports RI = 1 | 8 + B | NA | NA | NA |
| | | 8 antenna ports 1 < RI < 4 | 11 + B | NA | NA | NA |
| | | 8 antenna ports 4 < RI < 7 | 9 + B | NA | NA | NA |
| | | 8 antenna ports RI = 8 | 7 + B | NA | NA | NA |
| 4-I | Wideband CQI/IPMI | RI = 1 or RI > 1 | NA | NA | 4 + B | 4 + B |

The number of bits (B) that is required to report may be different depending on what is exactly reported as the quality measure and how many bits are used to quantize the quality measure information. It is also possible to use different reporting granularities (i.e. number of bits) for different PUCCH reporting modes.

In case of combining the subband CQI with the report of an IPMI set interference variability, the interference level estimations for the IPMIs should be done for the same subband.

As already explained before, PUSCH based reporting of the IPMI set interference variability is possible too, according to another embodiment of the invention. PUSCH-based CSI reports are triggered by the CSI request field in an uplink DCI format. The CSI request field can be extended in order to request either an interference variability report of a single IPMI set or the quality comparison of different IPMI sets (for comparison of IPMI sets, see later embodiments of the invention).

Another option is the extension of existing PUSCH-based CSI feedback types with the IPMI set interference variability of the IPMI set used on the reference resources (combination of subband and subframe) of the PUSCH-based CSI feedback.

Since resources for PUSCH-based CSI reports are assigned dynamically, the size of the PUSCH-based CSI feedback messages can be extended easily by B or more bits.

According to other embodiments of the invention, it is also possible to perform the reporting of the IPMI set quality measure (e.g. interference variability) on higher layers, such as layer 2 or above. The advantage is here that the restriction on the number of bits per report is less strict. The disadvantage is that higher layer reporting imposes higher layer latency than layer 1 reporting, which affects the accuracy of the reports since the IPMI set interference variability depends on the channel state and is therefore time dependent.

According to any of the above-explained embodiments, the mobile terminal is able to report the estimated and calculated IPMI set quality measure to the serving base station, so as to allow an improved scheduling of the mobile terminal. For example, the serving base station takes the IPMI set quality measure into account, preferably in addition to the standard CQI report when deciding which mobile terminal shall be scheduled, and/or which modulation and coding scheme shall be used for the data transmission to the mobile terminal. With the CQI report as specified for LTE, a mobile terminal reports the highest modulation and coding scheme that provides a certain block error rate (BLER) for the average measured interference power level. Considering in addition the interference variability to interpret the CQI report, allows the serving base station to improve scheduling, thus reducing the BLER and increasing the spectral efficiency.

In more detail, the serving base station may combine the reported IPMI set interference variability and information from the CQI report (in particular the mean interference, mean SINR), to form an effective metric on which basis the scheduling decision is to be performed. As the effective metric, the serving base station may calculate e.g. the mean SINR level[dB]−standard deviation of the IPMI set [dB], or the mean SINR level [dB]−0.5×IPMI level range [dB].

Figure 1:
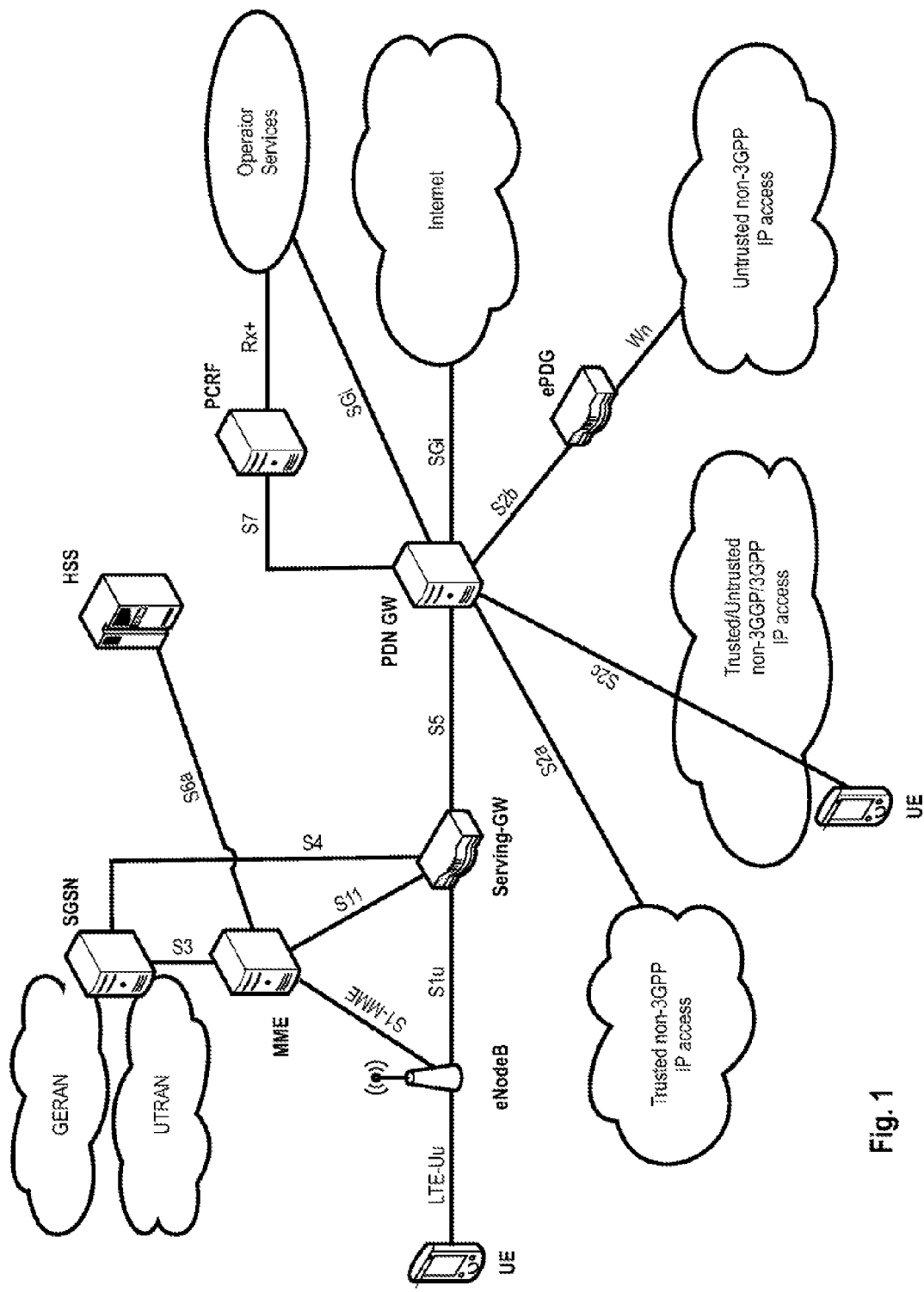
FIG. 1 shows an exemplary architecture of a 3GPP LTE system.
Figure 2:
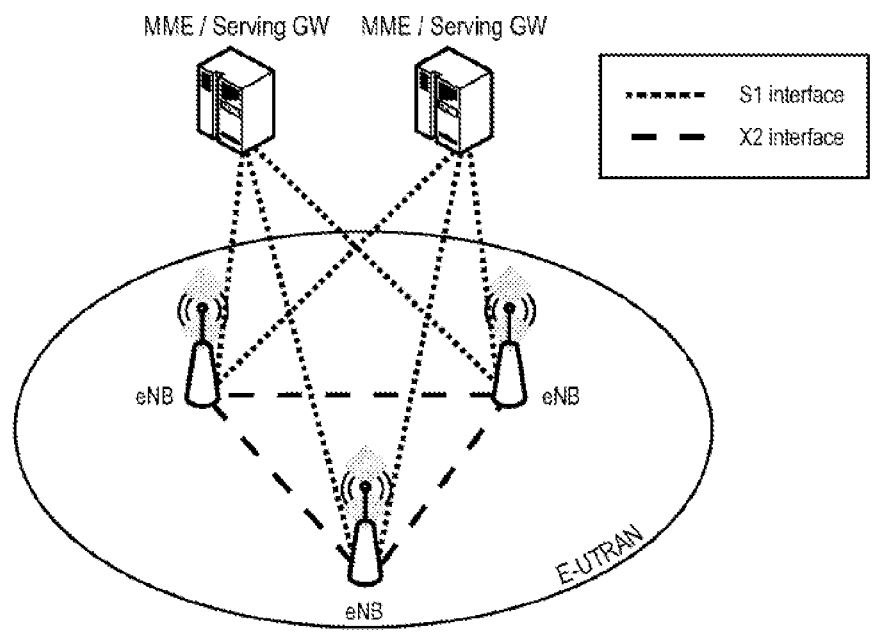
FIG. 2 shows an exemplary overview of the overall E-UTRAN architecture of 3GPP LTE.
Figure 3:
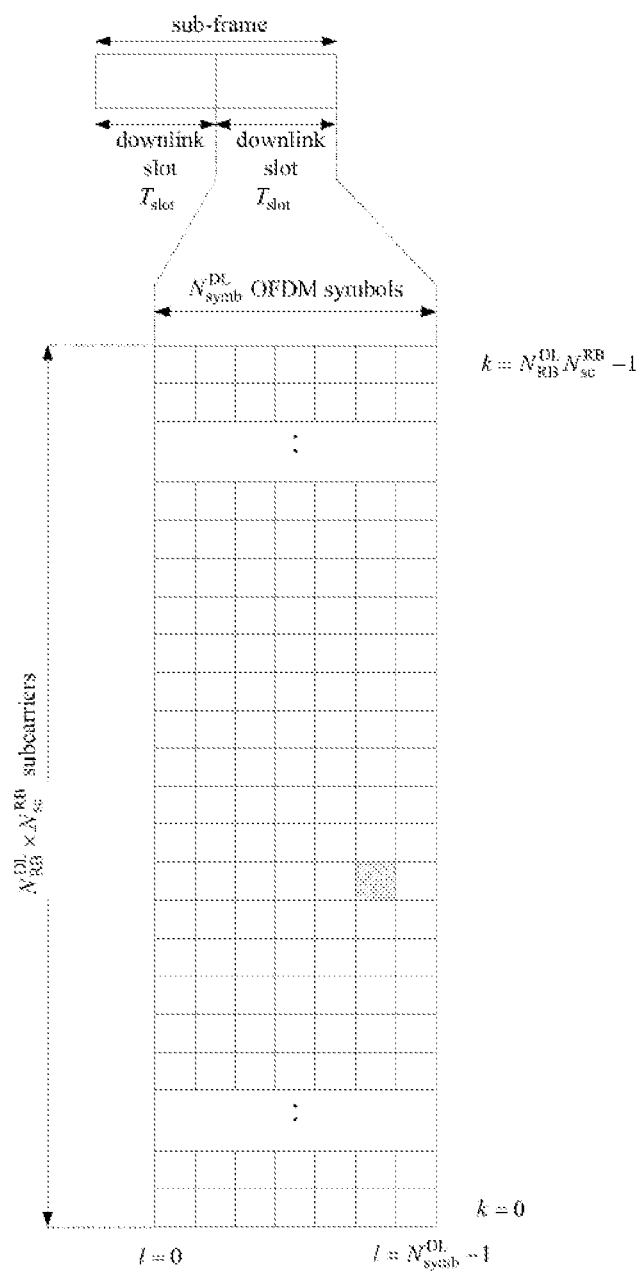
FIG. 3 shows exemplary subframe boundaries on a downlink component carrier as defined for 3GPP LTE (Release 8/9)
Figure 4:
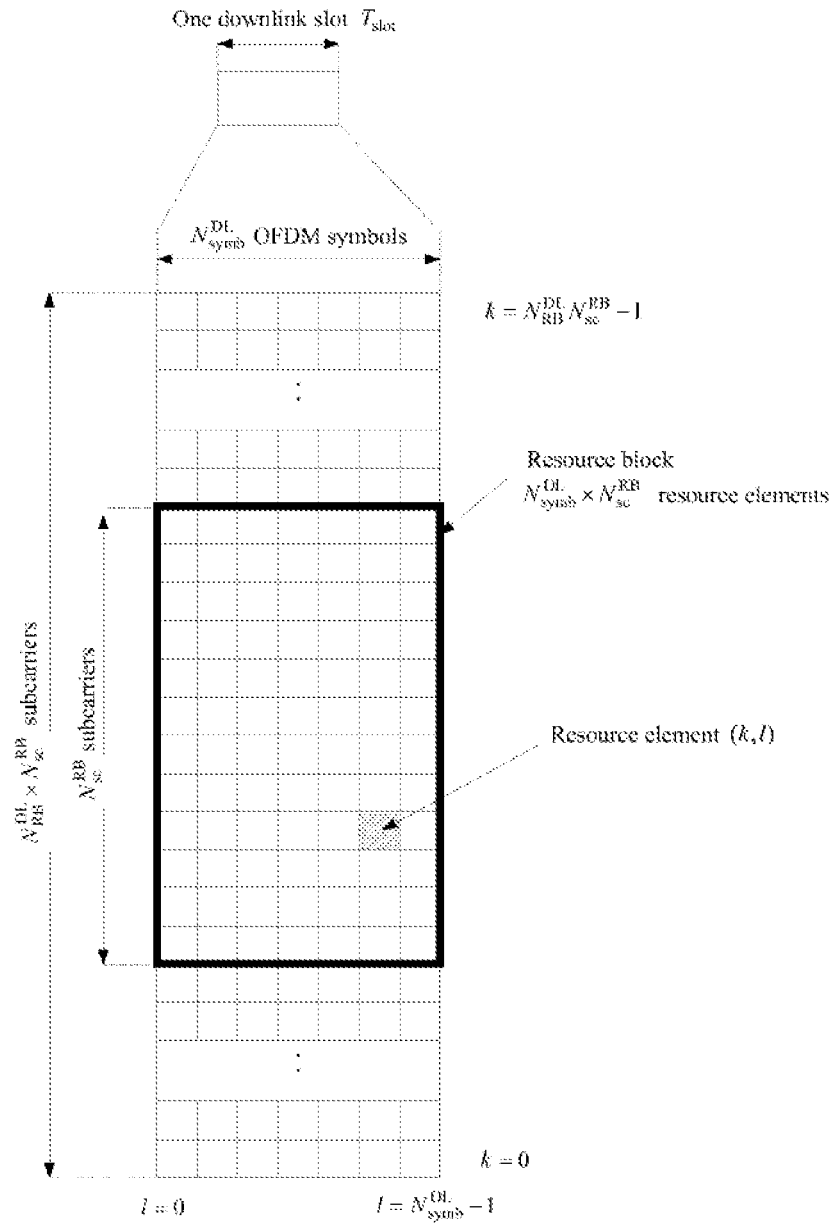
FIG. 4 shows an exemplary downlink resource grid of a downlink slot as defined for 3GPP LTE (Release 8/9)
Figure 5:
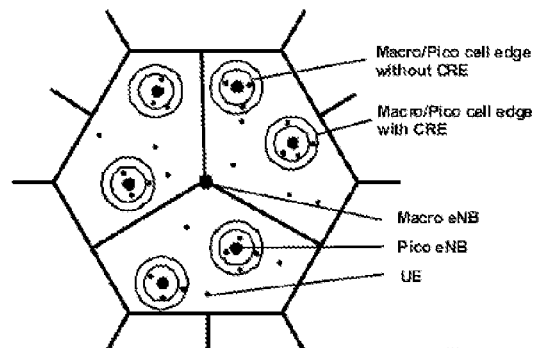
FIG. 5 shows a Heterogeneous Network (HetNet) with one macro cell and various pico cells.
Figure 6:
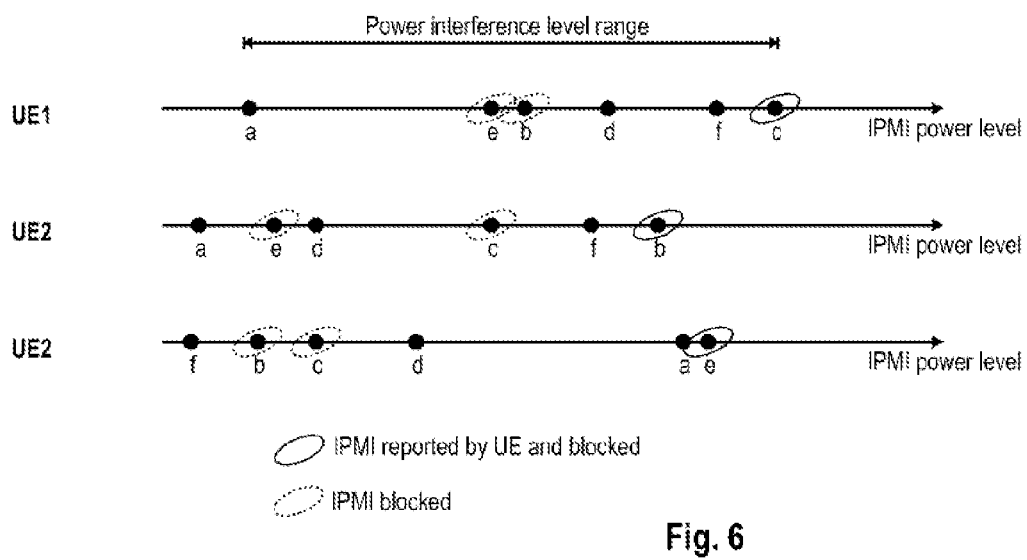
FIG. 6 illustrates the various interference power levels caused by different IPMI at various UEs, and further indicates the particular "worst" IMPI that are reported to the serving eNB of the UEs to be excluded from further use at the interfering eNB.
Figure 7:
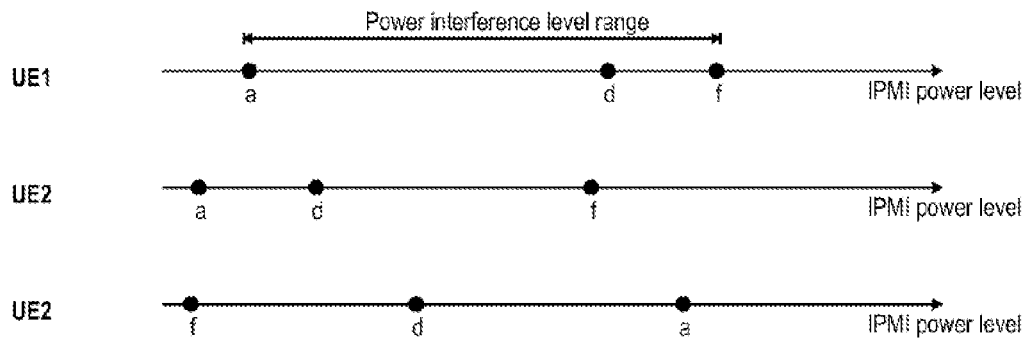
FIG. 7 is based on FIG. 6 and illustrates the interference power levels caused by the remaining IPMI, after applying IPMI restriction according to FIG. 6.
Figures 8, 9, 10:
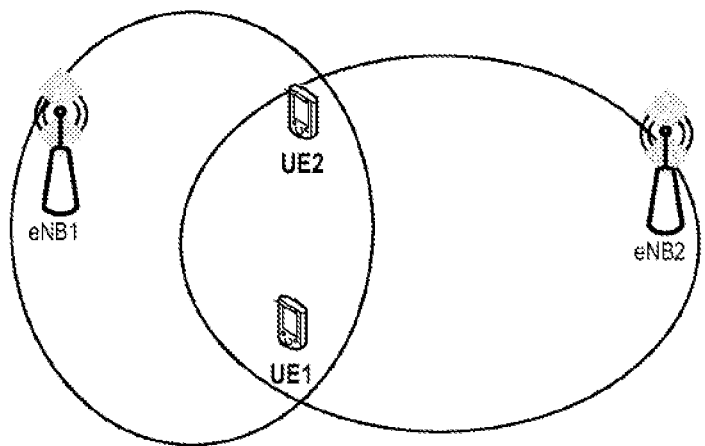
FIG. 8 illustrates a basic scenario with two neighbouring cells in which two UEs are located in one cell and experience intercell interference from the neighbour cell.
FIGS. 9 and 10 show two tables, each indicating the measurement results for the two UEs of FIG. 8 as to the SINR, each further indicating the reported CQI, the resulting BLER and the throughput achieved, FIG. 11 illustrate the use of different IMPI sets A and B for different subframe sets A and B.
Figure 11:
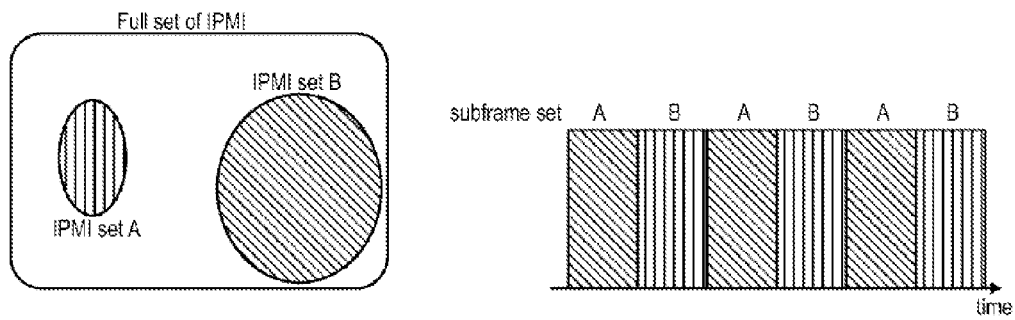
Figure 12:
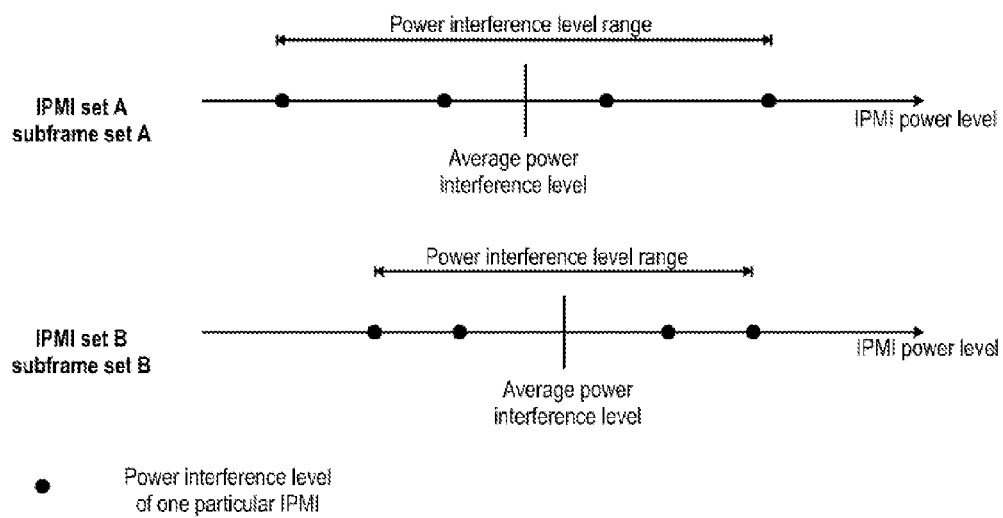
FIG. 12 shows the various interference power levels caused by the four IPMI of each IPMI set A and B, and the resulting average power interference level and power interference level range.

FIGS. 17 and 18 show two tables in which two different IPMI sets A and B are compared, for example, when the interferer base station uses IPMI set A for a subframe set A and IPMI set B for a subframe set B. In comparison to FIGS. 9 and 10, the serving base station now has information on the IPMI interference variability (in this case, as the standard deviation) and thus calculates the effective quality according to the above. By additionally considering the interference variability (IPMI std), and then using the effective quality as the criterion to decide on the scheduling, the scheduling decision is thus improved. In the particular case of FIG. 17, the effective quality is calculated to be 7 dB for IPMI set A and 5 dB for IPMI set B. As can be seen, the IPMI interference variability value (i.e. the flashlight effect) of the IPMI set has a significant influence on the effective quality as the decision criterion. The serving base station would prefer IPMI set A (i.e. subframe set A) in view of the higher effective quality. Accordingly, he would preferably schedule the mobile terminal on subframes of subframe set A. This leads to a higher throughput of 1.82.

Similarly, in the scenario of FIG. 18, though the reported CQI (quantized SINR mean) is the same for both IPMI sets, the additional information on the resulting flashlight effect allows a clear decision at the scheduler. Subframes from subframe set A are selected for scheduling the mobile terminal in view of the higher effective quality value, determined based on the reported interference variability.

According to another embodiment of the invention, the calculation of the interference variability for a IPMI set can be used to compare the quality of various IPMI sets to be used by the interferer base station, for example in connection with different subframe sets.

In this embodiments, it is assumed that the network constructs various IPMI sets for use by the interferer base station. This could be done e.g. based on previous WCI reports from different cells. In order to evaluate which of the various IPMI sets should be actually used by the interferer base station, the corresponding mobile terminals that will experience the intercell interference are provided with information on the IPMI sets. In more detail, as explained in connection with FIG. 14, the serving base station reports for each IPMI set information on the precoding matrices of which the IPMI set is composed. This may be done for example with bitmaps describing the different IPMI sets and the IPMI of which they are composed. Subsequently, the mobile terminal may measure the current channel to the interferer base station, and then estimates for each precoding matrix of each precoding matrix set the interference that would be caused at the mobile terminal if the interferer base station would use same.

Finally, the mobile terminal can construct a quality measure based on the interference variability for each precoding matrix set (IPMI set). This quality measure is used to compare the various IPMI sets, and thus to select one of them that shall be used by the interferer base station, preferably minimizing the interference impact at the mobile station.

Again, the interference variability might be at least one of several values, such as standard deviation, variance or range (difference between mix and max) of the interference power levels, and min and max of the interferences estimated for all precoding matrices of an IPMI set. One option to define the quality measure for the IPMI set, including the interference variability, is a linear combination as follows:

$$I_P(n) = \begin{pmatrix} \text{mean}(I_{IPMI}(n)) \\ \max(I_{IPMI}(n)) \\ \min(I_{IPMI}(n)) \\ \text{std}(I_{IPMI}(n)) \end{pmatrix}^t \cdot \begin{pmatrix} a_1 \\ a_2 \\ a_3 \\ a_4 \end{pmatrix} = M \cdot A \quad (11)$$

Some examples for reasonable configurations of A are for example:

(1) $\alpha_1=1.0$ $\alpha_2=0.0$ $\alpha_3=0.0$ $\alpha_4=0.0$
   The IPMI set quality is given by the mean of the interference power levels.
(2) $\alpha_1=1.0$ $\alpha_2=0.0$ $\alpha_3=0.0$ $\alpha_4<0.0$
   The IPMI set quality is given by the sum of mean and weighted standard deviation of the interference power levels.
(3) $\alpha_1=0.0$ $\alpha_2=1.0$ $\alpha_3=0.0$ $\alpha_4=0.0$
   The IPMI set quality is given by the maximum of the interference power levels.
(4) $\alpha_1=0.0$ $\alpha_2=1.0$ $\alpha_3=-1.0$ $\alpha_4=0.0$
   The IPMI set quality is given by the difference between maximum and minimum of the interference power levels. This is also known as the range.
(5) $1.0<\alpha_1<0.0$ $\alpha_2=1.0-\alpha_1$ $\alpha_3=0.0$ $\alpha_4=0.0$
   The IPMI set quality is a value between mean and maximum of the interference power levels.

As explained above, a quality measure is determined for each IPMI set. In order to determine a preferred IPMI set that shall be used by the interferer base station, the various quality measures are compared and that IPMI set providing the best quality measure (maximum or minimum metric value depending on the metrix definition) is taken as the preferred IPMI set.

In order to achieve this comparison to determine the preferred IPMI set, various embodiments are possible. According to a first one, the mobile terminal may perform all steps of the comparison and then only report to the serving base station which IPMI set is preferred. The minimum number of required bits is $B=\lceil \log 2(S) \rceil$, where S is the number of compared IPMI sets. Accordingly, only one bit would be required if two IPMI sets are compared. The serving base station then forwards the preferred IPMI set information to the interferer base station.

According to another solution, the quality measures are calculated in the mobile terminal and then reported to the serving base station. Then, the serving base station can perform the comparison and actually select the IPMI set with the best quality measure as the preferred IPMI set. It should be noted that it might not be necessary to report all quality measures for all IPMI sets. It might be sufficient to report the quality measure of K IPMI sets, where the K reported IPMI sets are those with the best/worst quality measures. The value of K can be semi-statically configured. The required number of bits in this case depends on the quality measure configuration (see e.g. above matrix A). When the quality measure takes into account both variability and the mean interference level of the IPMI set, it is required to use more bits than for just reporting the interference variability.

An example for a uniform quantization of the IPMI set quality metric is described in the following where B=4 bits are used for quantization which results in $2^4=16$ possible states (code points):

| Code Point | Mapping A |
| --- | --- |
| 0 0 0 0 | $I_P \leq -5.0$ dB |
| 0 0 0 1 | $-5.0$ dB $< I_P \leq -3.0$ dB |
| 0 0 1 0 | $-3.0$ dB $< I_P \leq -1.0$ dB |
| 0 0 1 1 | $-1.0$ dB $< I_P \leq 1.0$ dB |
| 0 1 0 0 | $1.0$ dB $< I_P \leq 3.0$ dB |
| 0 1 0 1 | $3.0$ dB $< I_P \leq 5.0$ dB |
| 0 1 1 0 | $5.0$ dB $< I_P \leq 7.0$ dB |
| 0 1 1 1 | $7.0$ dB $< I_P \leq 9.0$ dB |
| 1 0 0 0 | $9.0$ dB $< I_P \leq 11.0$ dB |
| 1 0 0 1 | $11.0$ dB $< I_P \leq 13.0$ dB |
| 1 0 1 0 | $13.0$ dB $< I_P \leq 15.0$ dB |
| 1 0 1 1 | $15.0$ dB $< I_P \leq 17.0$ dB |
| 1 1 0 0 | $17.0$ dB $< I_P \leq 19.0$ dB |
| 1 1 0 1 | $19.0$ dB $< I_P \leq 21.0$ dB |
| 1 1 1 0 | $21.0$ dB $< I_P \leq 23.0$ dB |
| 1 1 1 1 | $23.0$ dB $< I_P$ |

In still another embodiment, the quality measures are not reported as such, but the mobile terminal calculates a difference between two or more IPMI sets and quantizes the difference. Then, the quantized difference is reported to the serving base station together with the indices of the compared IPMI sets. The reporting in this case requires less bits than the individual reporting of the quality measures of the compared IPMI sets. Similar to the quantization for the interference variability, the difference of the quality measure values could be done in a uniform or non-uniform manner. The interfering base station is informed by the serving base station about the results of the IPMI set comparison via signalling over the X2 interface in an LTE deployment.

In any case, the information on the preferred IPMI set is then provided to the interferer base station, the corresponding preferred IPMI set to be used in the future to reduce intercell interference.

All of the above embodiments of the invention can be implemented in a Heterogeneous Network (HetNet) scenario, where the interferer base station is the macro base station and the interference victim mobile terminals are in pico cells controlled by the pico base stations (eNBs). Considering the interference variability is especially advantageous is such HetNet scenarios since there is a very high SINR (CQI) estimation uncertainty due to strong interference flashlight effects.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein. Furthermore, the eNodeB comprises means that enable the eNodeB to evaluate the IPMI set quality of respective user equipments from the IPMI set quality information received from the user equipments and to consider the IPMI set quality of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for determining a quality measure of at least one precoding matrix set usable for downlink data transmissions by an interferer base station in a mobile communication system, wherein a mobile terminal is located in the cell of a serving base station and experiences intercell interference from a neighbour cell controlled by the interferer base station, the method comprising the steps of:

informing the mobile terminal by the serving base station about the particular precoding matrices in the at least one precoding matrix set usable by the interferer base station, measuring by the mobile terminal the current channel state of the channel between the interferer base station and the mobile terminal, estimating by the mobile terminal the interference from each of the precoding matrices of the at least one precoding matrix set based on the measured current channel state, and determining an interference variability of the at least one precoding matrix set as a quality measure for the at least one precoding matrix set based on the estimated precoding matrix interferences, wherein the step of informing the mobile terminal about the particular precoding matrices in the at least one precoding matrix set:

is performed by using messages of the physical layer, the media access control layer or higher layers, and/or informs about weighting information regarding the usage probability of each precoding matrix of the at least one precoding matrix set usable by the interferer base station, and the weighting information is used by the mobile terminal in the step of determining the interference variability of the at least one precoding matrix set.

2. The method according to claim 1, further comprising the step of:

calculating a mean interference based on the estimated precoding matrix interferences, and including the calculated mean interference into the quality measure of the at least one precoding matrix set in addition to the interference variability, wherein preferably the weighting information is used by the mobile terminal in the step of calculating the mean interference.

3. The method according to claim 1, wherein the interference variability is at least one of the following:

a standard deviation of the interference from all precoding matrices of the at least one precoding matrix set, variance of the interference from all precoding matrices of the at least one precoding matrix set, minimum and/or maximum interference of any of the precoding matrices of the at least one precoding matrix set, range of the interferences from all precoding matrices of the at least one precoding matrix set, being preferably the difference between the maximum and minimum interference of any of the precoding matrices of the at least one precoding matrix set.

4. The method according to claim 1, further comprising the steps of:

reporting the quality measure of the at least one precoding matrix set from the mobile terminal to the serving base station, preferably within a channel quality report message, and considering the reported quality measure of the at least one precoding matrix set for scheduling decisions at the serving base station.

5. The method according to claim 4, wherein the serving base station:

schedules the mobile terminal for particular subframes of a radio frame based on the reported quality measure of the precoding matrix set, or selects a modulation and coding scheme for a transmission to the mobile terminal based on the reported quality measure of the precoding matrix set.

6. The method according to claim 1, wherein at least two precoding matrix sets are predefined one of which is to be used by the interferer base station, and the steps of informing, estimating and determining are performed for each of the at least two precoding matrix sets, the method further comprising the steps of:

determining by the mobile terminal a preferred precoding matrix set out of the at least two precoding matrix sets, based on the determined quality measure of the at least two precoding matrix sets, and reporting information on the preferred precoding matrix set from the mobile terminal over the serving base station to the interferer base station, or reporting the determined quality measure of the at least two precoding matrix sets from the mobile terminal to the serving base station, and determining by the serving base station a preferred precoding matrix set out of the at least two precoding matrix sets, based on the reported quality measure of the at least two precoding matrix sets, and reporting information on the preferred precoding matrix set from the serving base station to the interferer base station, or calculating by the mobile terminal a difference between the quality measures of the two precoding matrix sets, and reporting information on the difference from the mobile terminal to the serving base station, and determining by the serving base station a preferred precoding matrix set out of the at least two precoding matrix sets, based on the reported difference, and reporting information on the preferred precoding matrix set from the serving base station to the interferer base station.

7. The method according to claim 1, wherein a radio frame of the communication system is divided into at least two subframe sets, and wherein for each subframe set of the radio frame a different precoding matrix set is configured at the interferer base station, and the steps of informing, estimating and determining are performed for each precoding matrix set, and the step of informing further comprises informing the mobile terminal about the correspondence of each precoding matrix set to a subframe set.

8. A mobile terminal for determining a quality measure of at least one precoding matrix set usable for downlink data transmissions by an interferer base station in a mobile communication system, wherein the mobile terminal is located in the cell of a serving base station and experiences intercell interference from a neighbour cell controlled by the interferer base station, the mobile terminal comprising:

a receiver adapted to receive information from the serving base station about the particular precoding matrices in the at least one precoding matrix set usable by the interferer base station, a processor and the receiver adapted to measure the current channel state of the channel between the interferer base station and the mobile terminal, the processor adapted to estimate the interference from each of the precoding matrices of the at least one precoding matrix set based on the measured current channel state, and the processor adapted to determine an interference variability of the at least one precoding matrix set as a quality measure for the at least one precoding matrix set based on the estimated precoding matrix interferences, wherein the received information about the particular precoding matrices in the at least one precoding matrix set:

is in messages of the physical layer, the media access control layer or higher layers, and/or informs about weighting information regarding the usage probability of each precoding matrix of the at least one precoding matrix set usable by the interferer base station, and the weighting information is used when determining the interference variability of the at least one precoding matrix set.

9. The mobile terminal according to claim 8, wherein the transmitter is adapted to report the quality measure of the at least one precoding matrix set to the serving base station, preferably within a channel quality report message.

10. The mobile terminal according to claim 8, wherein at least two precoding matrix sets are predefined one of which is to be used by the interferer base station, and the receiver and processor are adapted to perform the receiving, estimating and determining for every precoding matrix set out of the at least two precoding matrix sets, wherein the processor is further adapted to determine a preferred precoding matrix set out of the at least two precoding matrix sets, based on the determined quality measure of the at least two precoding matrix sets, and the transmitter is further adapted to report information on the preferred precoding matrix set over the serving base station to the interferer base station, or wherein the transmitter is adapted to report the determined quality measure of the at least two precoding matrix sets to the serving base station, or wherein the processor is adapted to calculate a difference between the quality measures of the two precoding matrix sets, and the transmitter is adapted to report information on the difference to the serving base station.

11. The mobile terminal according to claim 8, wherein a radio frame of the communication system is divided into at least two subframe sets, and wherein for each subframe set of the radio frame a different precoding matrix set is configured at the interferer base station, and the receiver and processor are adapted to perform the receiving, estimating and determining for each precoding matrix set, wherein the receiver is further adapted to receive information about the correspondence of each precoding matrix set to a subframe set, or wherein different precoding matrix sets are configured for different subband and/or combination of subbands and subframes, and the receiver and processor are adapted to perform the receiving, estimating and determining for each subband and/or combination of subbands and subframes.

12. A serving base station for determining a quality measure of at least one precoding matrix set usable for downlink data transmissions by an interferer base station in a mobile communication system, wherein a mobile terminal is located in the cell of the serving base station and experiences intercell interference from a neighbour cell controlled by the interferer base station, the serving base station comprising:

a transmitter adapted to inform the mobile terminal about the particular precoding matrices in the at least one precoding matrix set usable by the interferer base station, wherein the mobile terminal estimates the interference from each of the precoding matrices of the at least one precoding matrix set based on a measured current channel state, the channel being between the interferer base station and the mobile terminal, a receiver adapted to receive information from the mobile terminal about the estimated interference for each of the precoding matrices of the at least one precoding matrix set, and a processor adapted to determine an interference variability of the at least one precoding matrix set as a quality measure for the at least one precoding matrix set based on the received estimated precoding matrix interferences, wherein the transmitter is adapted to inform the mobile terminal about the particular precoding matrices in the at least one precoding matrix set by using messages of the physical layer, the media access control layer or higher layers, and/or to inform about weighting information regarding the usage probability of each precoding matrix of the at least one precoding matrix set usable by the interferer base station, and the weighting information is used by the mobile terminal in the step of determining the interference variability of the at least one precoding matrix set.

13. The serving base station according to claim 12, wherein the processor is adapted to schedule the mobile terminal for particular subframes of a radio frame based on the determined interference variability of the precoding matrix set, or to select a modulation and coding scheme for a transmission to the mobile terminal based on the determined interference variability of the precoding matrix set.

14. The serving base station according to claim 12, wherein at least two precoding matrix sets are predefined one of which is to be used by the interferer base station, and the transmitter, receiver and processor are adapted to respectively perform the informing, receiving and determining for each of the at least two precoding matrix sets, wherein the processor is further adapted to determine a preferred precoding matrix set out of the at least two precoding matrix sets, based on the determined quality measure of the at least two precoding matrix sets, and the transmitter is adapted to report information on the preferred precoding matrix set to the interferer base station.

* * * * *